United States Patent
Tang

[19]

[11] Patent Number: 6,061,673

[45] Date of Patent: May 9, 2000

[54] LEARNING METHODS IN BINARY SYSTEMS

[75] Inventor: Zheng Tang, Miyazaki, Japan

[73] Assignee: Sowa Institute of Technology Co., Ltd., Miyazaki-ken, Japan

[21] Appl. No.: 08/744,299

[22] Filed: Nov. 6, 1996

[51] Int. Cl.[7] .................................................. G06F 15/18
[52] U.S. Cl. ............................................. 706/25; 706/41
[58] Field of Search .................................. 706/25, 23, 27, 706/41; 382/157

[56] References Cited

U.S. PATENT DOCUMENTS

| | | | |
|---|---|---|---|
| 5,212,765 | 5/1993 | Skeirik | 417/44.2 |
| 5,226,092 | 7/1993 | Chen | 382/157 |
| 5,333,241 | 7/1994 | Furuta et al. | 706/25 |
| 5,696,883 | 12/1997 | Arima | 706/38 |

*Primary Examiner*—Robert W. Downs
*Assistant Examiner*—Sanjiv Shah
*Attorney, Agent, or Firm*—Evenson, McKeown Edwards & Lenahan

[57] ABSTRACT

This invention provides learning methods in binary systems by modifying the connected states of the circuit among each basic binary gate in binary combined logical and sequential circuits composed with basic binary gates such as AND, OR, NOT, NAND, NOR and EXOR gates. As the pseudo-neuron theory and the pseudo-potential energy theory are skillfully introduced, it is possible to attain specified learning effects during a very short learning period. Further, as implementation of the learning methods into the conventional computer and other digital equipment is simple, it is expected to be used widely in wide application, for example, such as in image processing, voice processing or natural word processing.

16 Claims, 28 Drawing Sheets

Fig. 1 Pseudo-Potential Energy of Connection States

| Order \ gate input | AND | OR | NOT | NAND | NOR |
|---|---|---|---|---|---|
| 0 | ①1-connect<br>②Inverter connect<br>③direct connect<br>④0-connect | ①1-connect<br>②Inverter connect<br>③direct connect<br>④0-connect | ①0-connect<br>②direct-connect<br>③Inverter connect<br>④1-connect | ①0-connect<br>②direct-connect<br>③Inverter connect<br>④1-connect | ①0-connect<br>②direct-connect<br>③Inverter connect<br>④1-connect |
| 1 | ①1-connect<br>②direct-connect<br>③Inverter connect<br>④0-connect | ①1-connect<br>②direct-connect<br>③Inverter connect<br>④0-connect | ①0-connect<br>②Inverter connect<br>③direct connect<br>④1-connect | ①0-connect<br>②Inverter connect<br>③direct connect<br>④1-connect | ①0-connect<br>②Inverter connect<br>③direct connect<br>④1-connect |

Fig. 2 Modification method of pseudo-potential
energy of connection states
| Teacher's signal | output Signal | A N D | O R | N O T | NAND | N O R | Remark |
|---|---|---|---|---|---|---|---|
| 0 | 0 | 0 | 0 | 0 | 0 | 0 | |
| 0 | 1 | −1 | −1 | −1 | −1 | −1 | note 1 |
| 1 | 0 | 1 | 1 | 1 | 1 | 1 | note 2 |
| 1 | 1 | 0 | 0 | 0 | 0 | 0 | |
  1= pseudo-potential energy to upper
 −1= pseudo-potential energy to lower
  0= pseudo-potential energy hold
     note 1 :Connection States①and②only
     note 2 :Connection States③and④only
Fig. 3 combinational network
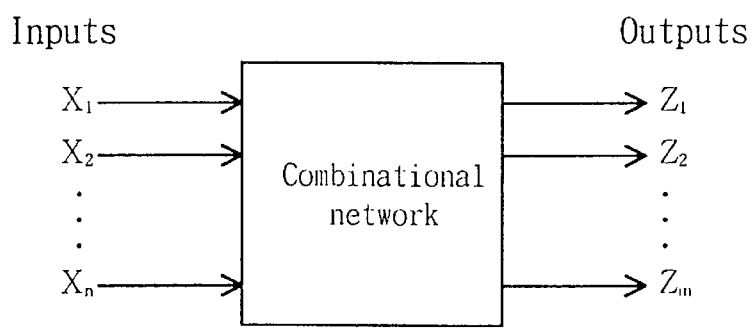

Fig.10 Truth table
| $X_1$ | $X_2$ | $X_3$ | $X_4$ | Z |
|---|---|---|---|---|
| 0 | 0 | 0 | 0 | |
| 0 | 0 | 0 | 1 | |
| 0 | 0 | 1 | 0 | |
| 0 | 0 | 1 | 1 | 1 |
| 0 | 1 | 0 | 0 | 1 |
| 0 | 1 | 0 | 1 | 1 |
| 0 | 1 | 1 | 0 | 1 |
| 0 | 1 | 1 | 1 | 1 |
| 1 | 0 | 0 | 0 | |
| 1 | 0 | 0 | 1 | |
| 1 | 0 | 1 | 0 | |
| 1 | 0 | 1 | 1 | 1 |
| 1 | 1 | 0 | 0 | 1 |
| 1 | 1 | 0 | 1 | 1 |
| 1 | 1 | 1 | 0 | |
| 1 | 1 | 1 | 1 | |
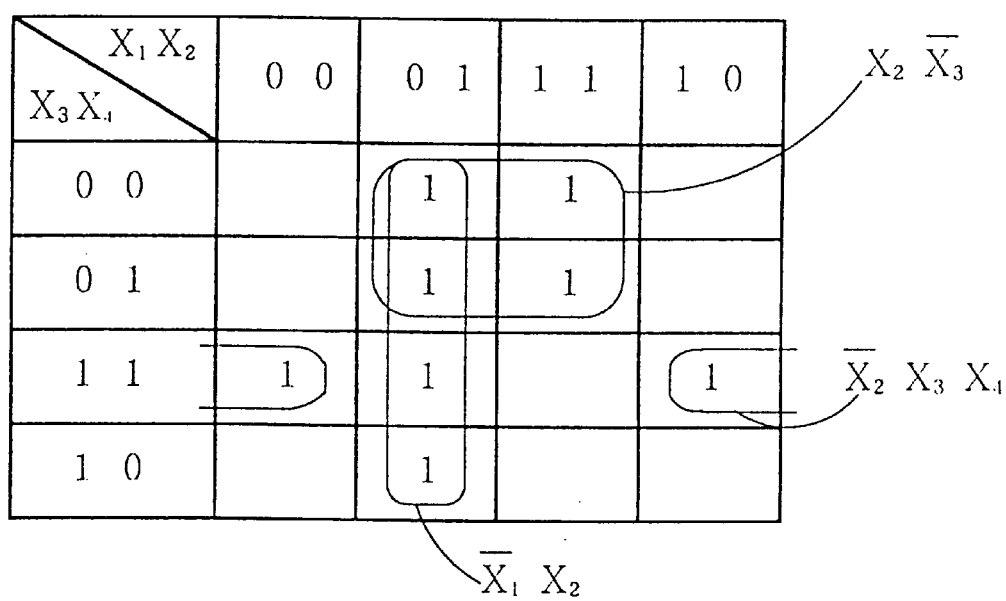
Fig.11 Karnaugh map Fig. 12 AND-OR network
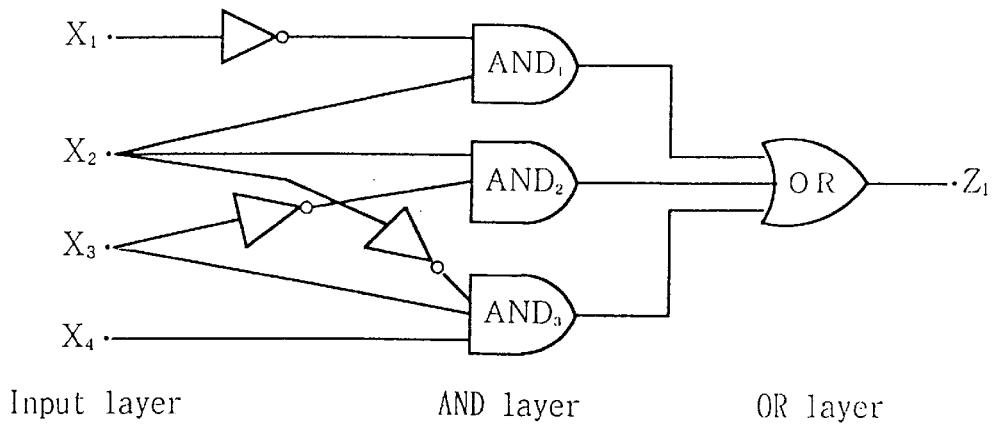
Input layer            AND layer            OR layer
Fig. 13 Threshold function and model of the pseudo-neuron
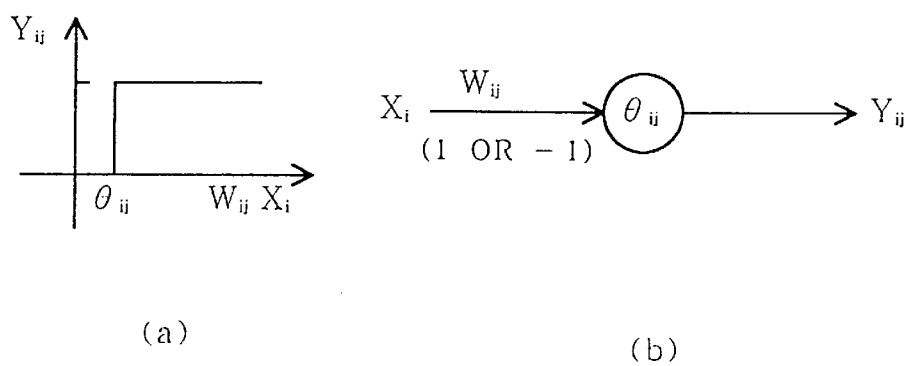
(a)                         (b)

Fig. 14 Connection state expression with pseudo-neuron

| weights | Threshold $\theta_{ij}$ | Input $X_i$ | Output $Y_{ij}$ | Connection states |
|---|---|---|---|---|
| 1 | −1.5 | 0 | 1 | 1-connetct |
|   |      | 1 | 1 |            |
|   | −0.5 | 0 | 1 | 1-connect  |
|   |      | 1 | 1 |            |
|   | 0.5  | 0 | 0 | direct connect |
|   |      | 1 | 1 |            |
|   | 1.5  | 0 | 0 | 0-connect  |
|   |      | 1 | 0 |            |
| −1 | −1.5 | 0 | 1 | 1-connect |
|    |      | 1 | 1 |           |
|    | −0.5 | 0 | 1 | Inverter connect |
|    |      | 1 | 0 |           |
|    | 0.5  | 0 | 0 | 0-connect |
|    |      | 1 | 0 |           |
|    | 1.5  | 0 | 0 | 0-connect |
|    |      | 1 | 0 |           |

| Z | T | ANDj | M | m | Yij | Xi | ΔWij | Δθij |
|---|---|------|---|---|-----|-----|------|------|
| 0 | 0 | 0 | 0 | 0 | 0 | 0 | HP | HP |
| ⋮ | ⋮ | ⋮ | ⋮ | ⋮ | ⋮ | ⋮ | ⋮ | ⋮ |
| 0 | 0 | 1 | 1 | 1 | 1 | 1 | HP | HP |
| 0 | 1 | 0 | 0 | 0 | 0 | 0 | HP | 0 |
| 0 | 1 | 0 | 0 | 0 | 0 | 1 | 1 | 0 |
| 0 | 1 | 0 | 0 | 0 | 1 | 0 | HP | HP |
| 0 | 1 | 0 | 0 | 0 | 1 | 1 | HP | HP |
| 0 | 1 | 0 | 0 | 1 | 0 | 0 | HP | 0 |
| 0 | 1 | 0 | 0 | 1 | 0 | 1 | 1 | 0 |
| 0 | 1 | 0 | 0 | 1 | 1 | 0 | IMPOSSIBLE | |
| 0 | 1 | 0 | 0 | 1 | 1 | 1 | | |
| 0 | 1 | 0 | 1 | 0 | 0 | 0 | IMPOSSIBLE | |
| 0 | 1 | 0 | 1 | 0 | 0 | 1 | | |
| 0 | 1 | 0 | 1 | 0 | 1 | 0 | | |
| 0 | 1 | 0 | 1 | 0 | 1 | 1 | | |
| 0 | 1 | 0 | 1 | 1 | 0 | 0 | | |
| 0 | 1 | 0 | 1 | 1 | 0 | 1 | | |
| 0 | 1 | 0 | 1 | 1 | 1 | 0 | | |
| 0 | 1 | 0 | 1 | 1 | 1 | 1 | | |
| 0 | 1 | 1 | 0 | 0 | 0 | 0 | IMPOSSIBLE | |
| 0 | 1 | 1 | 0 | 0 | 0 | 1 | | |
| 0 | 1 | 1 | 0 | 0 | 1 | 0 | | |
| 0 | 1 | 1 | 0 | 0 | 1 | 1 | | |
| 0 | 1 | 1 | 0 | 1 | 0 | 0 | | |
| 0 | 1 | 1 | 0 | 1 | 0 | 1 | | |
| 0 | 1 | 1 | 0 | 1 | 1 | 0 | | |
| 0 | 1 | 1 | 0 | 1 | 1 | 1 | | |
| 0 | 1 | 1 | 1 | 0 | 0 | 0 | | |
| 0 | 1 | 1 | 1 | 0 | 0 | 1 | | |
| 0 | 1 | 1 | 1 | 0 | 1 | 0 | | |
| 0 | 1 | 1 | 1 | 0 | 1 | 1 | | |
| 0 | 1 | 1 | 1 | 1 | 0 | 0 | | |
| 0 | 1 | 1 | 1 | 1 | 0 | 1 | | |
| 0 | 1 | 1 | 1 | 1 | 1 | 0 | | |
| 0 | 1 | 1 | 1 | 1 | 1 | 1 | | |

FIG. 18

| Z | T | ANDj | M | m | Yij | X | ΔWij | Δθij |
|---|---|------|---|---|-----|---|------|------|
| 1 | 0 | 0 | 0 | 0 | 0 | 0 | | |
| 1 | 0 | 0 | 0 | 0 | 0 | 1 | | |
| 1 | 0 | 0 | 0 | 0 | 1 | 0 | | |
| 1 | 0 | 0 | 0 | 0 | 1 | 1 | IMPOSSIBLE | |
| 1 | 0 | 0 | 0 | 1 | 0 | 0 | | |
| 1 | 0 | 0 | 0 | 1 | 0 | 1 | | |
| 1 | 0 | 0 | 0 | 1 | 1 | 0 | | |
| 1 | 0 | 0 | 0 | 1 | 1 | 1 | | |
| 1 | 0 | 0 | 1 | 0 | 0 | 0 | HP | HP |
| 1 | 0 | 0 | 1 | 0 | 0 | 1 | HP | HP |
| 1 | 0 | 0 | 1 | 0 | 1 | 0 | HP | HP |
| 1 | 0 | 0 | 1 | 0 | 1 | 1 | HP | HP |
| 1 | 0 | 0 | 1 | 1 | 0 | 0 | HP | HP |
| 1 | 0 | 0 | 1 | 1 | 0 | 1 | HP | HP |
| 1 | 0 | 0 | 1 | 1 | 1 | 0 | IMPOSSIBLE | |
| 1 | 0 | 0 | 1 | 1 | 1 | 1 | | |
| 1 | 0 | 1 | 0 | 0 | 0 | 0 | | |
| 1 | 0 | 1 | 0 | 0 | 0 | 1 | IMPOSSIBLE | |
| 1 | 0 | 1 | 0 | 0 | 1 | 0 | | |
| 1 | 0 | 1 | 0 | 0 | 1 | 1 | | |
| 1 | 0 | 1 | 0 | 1 | 0 | 0 | IMPOSSIBLE | |
| 1 | 0 | 1 | 0 | 1 | 0 | 1 | | |
| 1 | 0 | 1 | 0 | 1 | 1 | 0 | HP | 1 |
| 1 | 0 | 1 | 0 | 1 | 1 | 1 | 0 | 1 |
| 1 | 0 | 1 | 1 | 0 | 0 | 0 | | |
| 1 | 0 | 1 | 1 | 0 | 0 | 1 | IMPOSSIBLE | |
| 1 | 0 | 1 | 1 | 0 | 1 | 0 | | |
| 1 | 0 | 1 | 1 | 0 | 1 | 1 | | |
| 1 | 0 | 1 | 1 | 1 | 0 | 0 | IMPOSSIBLE | |
| 1 | 0 | 1 | 1 | 1 | 0 | 1 | | |
| 1 | 0 | 1 | 1 | 1 | 1 | 0 | HP | 1 |
| 1 | 0 | 1 | 1 | 1 | 1 | 1 | 0 | 1 |
| 1 | 1 | 0 | 0 | 0 | 0 | 0 | HP | HP |
| ⋮ | ⋮ | ⋮ | ⋮ | ⋮ | ⋮ | ⋮ | ⋮ | ⋮ |

FIG. 19

Fig20 Karnaugh map of the threshold update $\Delta\theta_{ij}$

| Z T AND / M m Y$_{ij}$ | 000 | 001 | 011 | 010 | 110 | 111 | 101 | 100 |
|---|---|---|---|---|---|---|---|---|
| 000 | HP | HP | — | 0  | HP | HP | — | — |
| 001 | HP | HP | — | HP | HP | HP | — | — |
| 011 | HP | HP | — | —  | HP | HP | 1 | — |
| 010 | HP | HP | — | 0  | HP | HP | — | — |
| 110 | HP | HP | — | —  | HP | HP | — | HP |
| 111 | HP | HP | — | —  | HP | HP | 1 | — |
| 101 | HP | HP | — | —  | HP | HP | — | HP |
| 100 | HP | HP | — | —  | HP | HP | — | HP |

| THRESHOLD WEIGHTS | | INPUT $X_i$ | OUTPUT $Y_{ij}$ | CONNECTION STATES | CONNECTION ASSIGNMENT | $q_3\ q_2\ q_1$ |
|---|---|---|---|---|---|---|
| 1 | -1.5 | 0 | 1 | 1-CONNECT | $S_0$ | 0 0 0 |
|   |      | 1 | 1 |           |       |       |
| 1 | -0.5 | 0 | 1 | 1-CONNECT | $S_1$ | 0 0 1 |
|   |      | 1 | 1 |           |       |       |
| 1 | 0.5  | 0 | 0 | DIRECT CONNECT | $S_2$ | 0 1 0 |
|   |      | 1 | 1 |           |       |       |
| 1 | 1.5  | 0 | 0 | 0-CONNECT | $S_3$ | 0 1 1 |
|   |      | 1 | 0 |           |       |       |
| -1 | -1.5 | 0 | 1 | 1-CONNECT | $S_4$ | 1 0 0 |
|    |      | 1 | 1 |           |       |       |
| -1 | -0.5 | 0 | 1 | INVERTER CONNECT | $S_5$ | 1 0 1 |
|    |      | 1 | 0 |           |       |       |
| -1 | 0.5  | 0 | 0 | 0-CONNECT | $S_6$ | 1 1 0 |
|    |      | 1 | 0 |           |       |       |
| -1 | 1.5  | 0 | 0 | 0-CONNECT | $S_7$ | 1 1 1 |
|    |      | 1 | 0 |           |       |       |

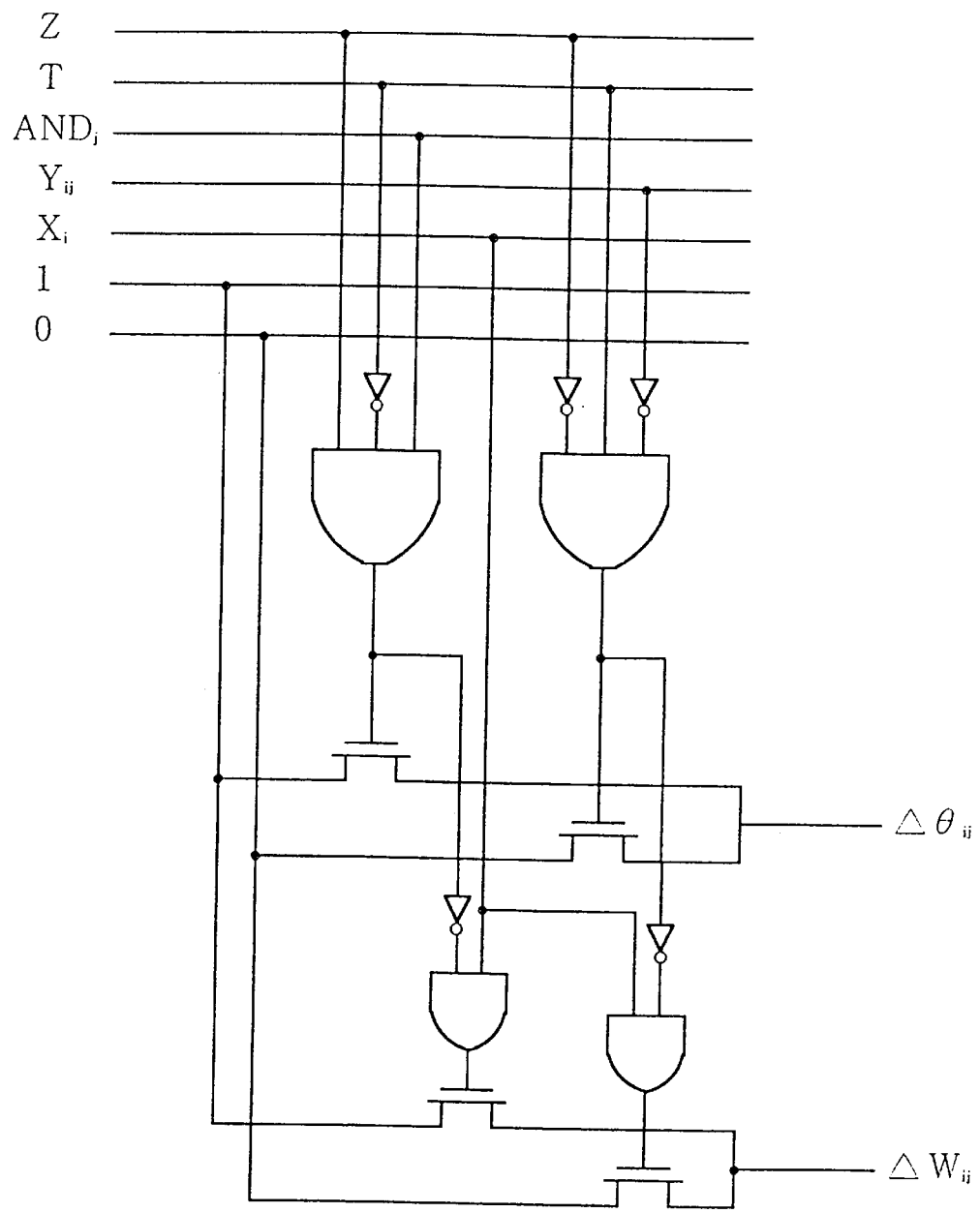
Fig. 23 Circuit implementation of learning algorithm

| INPUT \ STATES | NEXT STATES | |
|---|---|---|
| | 0 | 1 |
| S0 | S0 | S1 |
| S1 | S0 | S2 |
| S2 | S1 | S3 |
| S3 | S2 | S3 |
| S4 | S4 | S5 |
| S5 | S4 | S6 |
| S6 | S5 | S7 |
| S7 | S6 | S7 |

| INPUT \ STATES | NEXT STATES | |
|---|---|---|
| | 0 | 1 |
| S0 | S0 | S4 |
| S1 | S1 | S5 |
| S2 | S2 | S6 |
| S3 | S3 | S7 |
| S4 | S0 | S4 |
| S5 | S1 | S5 |
| S6 | S2 | S6 |
| S7 | S3 | S7 |

Fig. 26
Truth table for threshold learning circuit

| $\triangle \theta$ | $q_3$ | $q_2$ | $q_1$ | $q_3'$ | $q_2'$ | $q_1'$ |
|---|---|---|---|---|---|---|
| 0 | 0 | 0 | 0 | 0 | 0 | 0 |
| 0 | 0 | 0 | 1 | 0 | 0 | 0 |
| 0 | 0 | 1 | 0 | 0 | 0 | 1 |
| 0 | 0 | 1 | 1 | 0 | 1 | 0 |
| 0 | 1 | 0 | 0 | 1 | 0 | 0 |
| 0 | 1 | 0 | 1 | 1 | 0 | 0 |
| 0 | 1 | 1 | 0 | 1 | 0 | 1 |
| 0 | 1 | 1 | 1 | 1 | 1 | 0 |
| 1 | 0 | 0 | 0 | 0 | 0 | 1 |
| 1 | 0 | 0 | 1 | 0 | 1 | 0 |
| 1 | 0 | 1 | 0 | 0 | 1 | 1 |
| 1 | 0 | 1 | 1 | 0 | 1 | 1 |
| 1 | 1 | 0 | 0 | 1 | 0 | 1 |
| 1 | 1 | 0 | 1 | 1 | 1 | 0 |
| 1 | 1 | 1 | 0 | 1 | 1 | 1 |
| 1 | 1 | 1 | 1 | 1 | 1 | 1 |

Fig. 27
Truth table for wieght learning circuit

| $\triangle W$ | $q_3$ | $q_2$ | $q_1$ | $q_3'$ | $q_2'$ | $q_1'$ |
|---|---|---|---|---|---|---|
| 0 | 0 | 0 | 0 | 0 | 0 | 0 |
| 0 | 0 | 0 | 1 | 0 | 0 | 1 |
| 0 | 0 | 1 | 0 | 0 | 1 | 0 |
| 0 | 0 | 1 | 1 | 0 | 1 | 1 |
| 0 | 1 | 0 | 0 | 0 | 0 | 0 |
| 0 | 1 | 0 | 1 | 0 | 0 | 1 |
| 0 | 1 | 1 | 0 | 0 | 1 | 0 |
| 0 | 1 | 1 | 1 | 0 | 1 | 1 |
| 1 | 0 | 0 | 0 | 1 | 0 | 0 |
| 1 | 0 | 0 | 1 | 1 | 0 | 1 |
| 1 | 0 | 1 | 0 | 1 | 1 | 0 |
| 1 | 0 | 1 | 1 | 1 | 1 | 1 |
| 1 | 1 | 0 | 0 | 1 | 0 | 0 |
| 1 | 1 | 0 | 1 | 1 | 0 | 1 |
| 1 | 1 | 1 | 0 | 1 | 1 | 0 |
| 1 | 1 | 1 | 1 | 1 | 1 | 1 |

Fig. 28 Truth table of weight and threshold modification circuits

| $\Delta W_{ij}$ | $\Delta \theta_{ij}$ | $q_3$ | $q_2$ | $q_1$ | $q_3'$ | $q_2'$ | $q_1'$ |
|---|---|---|---|---|---|---|---|
| 0 | 0 | 0 | 0 | 0 | 0 | 0 | 0 |
| 0 | 0 | 0 | 0 | 1 | 0 | 0 | 0 |
| 0 | 0 | 0 | 1 | 0 | 0 | 0 | 1 |
| 0 | 0 | 0 | 1 | 1 | 0 | 1 | 0 |
| 0 | 0 | 1 | 0 | 0 | 0 | 0 | 0 |
| 0 | 0 | 1 | 0 | 1 | 0 | 0 | 0 |
| 0 | 0 | 1 | 1 | 0 | 0 | 0 | 1 |
| 0 | 0 | 1 | 1 | 1 | 0 | 1 | 0 |
| 0 | 1 | 0 | 0 | 0 | 0 | 0 | 1 |
| 0 | 1 | 0 | 0 | 1 | 0 | 1 | 0 |
| 0 | 1 | 0 | 1 | 0 | 0 | 1 | 1 |
| 0 | 1 | 0 | 1 | 1 | 0 | 1 | 1 |
| 0 | 1 | 1 | 0 | 0 | 0 | 0 | 1 |
| 0 | 1 | 1 | 0 | 1 | 0 | 1 | 0 |
| 0 | 1 | 1 | 1 | 0 | 0 | 1 | 1 |
| 0 | 1 | 1 | 1 | 1 | 0 | 1 | 1 |
| 1 | 0 | 0 | 0 | 0 | 1 | 0 | 0 |
| 1 | 0 | 0 | 0 | 1 | 1 | 0 | 0 |
| 1 | 0 | 0 | 1 | 0 | 1 | 0 | 1 |
| 1 | 0 | 0 | 1 | 1 | 1 | 1 | 0 |
| 1 | 0 | 1 | 0 | 0 | 1 | 0 | 0 |
| 1 | 0 | 1 | 0 | 1 | 1 | 0 | 0 |
| 1 | 0 | 1 | 1 | 0 | 1 | 0 | 1 |
| 1 | 0 | 1 | 1 | 1 | 1 | 1 | 0 |
| 1 | 1 | 0 | 0 | 0 | 1 | 0 | 1 |
| 1 | 1 | 0 | 0 | 1 | 1 | 1 | 0 |
| 1 | 1 | 0 | 1 | 0 | 1 | 1 | 1 |
| 1 | 1 | 0 | 1 | 1 | 1 | 1 | 1 |
| 1 | 1 | 1 | 0 | 0 | 1 | 0 | 1 |
| 1 | 1 | 1 | 0 | 1 | 1 | 1 | 0 |
| 1 | 1 | 1 | 1 | 0 | 1 | 1 | 1 |
| 1 | 1 | 1 | 1 | 1 | 1 | 1 | 1 |

Fig. 29 karnaugh map of next state

| $q_3\ q_2\ q_1$ \ $\Delta W_{ij}\ \Delta \theta_{ij}$ | 0 0 | 0 1 | 1 1 | 1 0 |
|---|---|---|---|---|
| 0 0 0 | | | 1 | 1 |
| 0 0 1 | | | 1 | 1 |
| 0 1 1 | | | 1 | 1 |
| 0 1 0 | | | 1 | 1 |
| 1 1 0 | | | 1 | 1 |
| 1 1 1 | | | 1 | 1 |
| 1 0 1 | | | 1 | 1 |
| 1 0 0 | | | 1 | 1 |

$\Delta W_{ij}$

Fig. 30

| $q_3\ q_2\ q_1$ \ $\Delta W_{ij}\ \Delta \theta_{ij}$ | 0 0 | 0 1 | 1 1 | 1 0 |
|---|---|---|---|---|
| 0 0 0 | | | | |
| 0 0 1 | | 1 | 1 | |
| 0 1 1 | 1 | 1 | 1 | 1 |
| 0 1 0 | | 1 | 1 | |
| 1 1 0 | | 1 | 1 | |
| 1 1 1 | 1 | 1 | 1 | 1 |
| 1 0 1 | | 1 | 1 | |
| 1 0 0 | | | | |

$q_2\ q_1$ $\Delta \theta_{ij}\ q_1 + \Delta \theta_{ij}\ q_2$

Fig. 31

| $\Delta W_{ij}$ \ $\Delta \theta_{ij}$  $q_3 q_2 q_1$ | 0 0 | 0 1 | 1 1 | 1 0 |
|---|---|---|---|---|
| 0 0 0 |  | 1 | 1 |  |
| 0 0 1 |  |  |  |  |
| 0 1 1 |  | 1 | 1 |  |
| 0 1 0 | 1 | 1 | 1 | 1 |
| 1 1 0 | 1 | 1 | 1 | 1 |
| 1 1 1 |  | 1 | 1 |  |
| 1 0 1 |  |  |  |  |
| 1 0 0 |  | 1 | 1 |  |

$\Delta \theta_{ij} q_2$ $q_2 q_1$ $\Delta \theta_{ij} q_2 q_1$

Fig. 37 Truth table of connection function

| $X_i$ | $q_2$ | $q_1$ | $Y_{ij}$ |
|---|---|---|---|
| 0 | 0 | 0 | 0 |
| 0 | 0 | 1 | 1 |
| 0 | 1 | 0 | 0 |
| 0 | 1 | 1 | 1 |
| 1 | 0 | 0 | 0 |
| 1 | 0 | 1 | 0 |
| 1 | 1 | 0 | 1 |
| 1 | 1 | 1 | 1 |

Fig. 32 Modification circuit diagram

|  | $q_3$ | $q_2$ | $q_1$ | S (1) | S (X) | S (1-X) | S (0) |
|---|---|---|---|---|---|---|---|
| $S_0$ | 0 | 0 | 0 | 1 | | | |
| $S_1$ | 0 | 0 | 1 | 1 | | | |
| $S_2$ | 0 | 1 | 0 | | 1 | | |
| $S_3$ | 0 | 1 | 1 | | | | 1 |
| $S_4$ | 1 | 0 | 0 | 1 | | | |
| $S_5$ | 1 | 0 | 1 | | | 1 | |
| $S_6$ | 1 | 1 | 0 | | | | 1 |
| $S_7$ | 1 | 1 | 1 | | | | 1 |

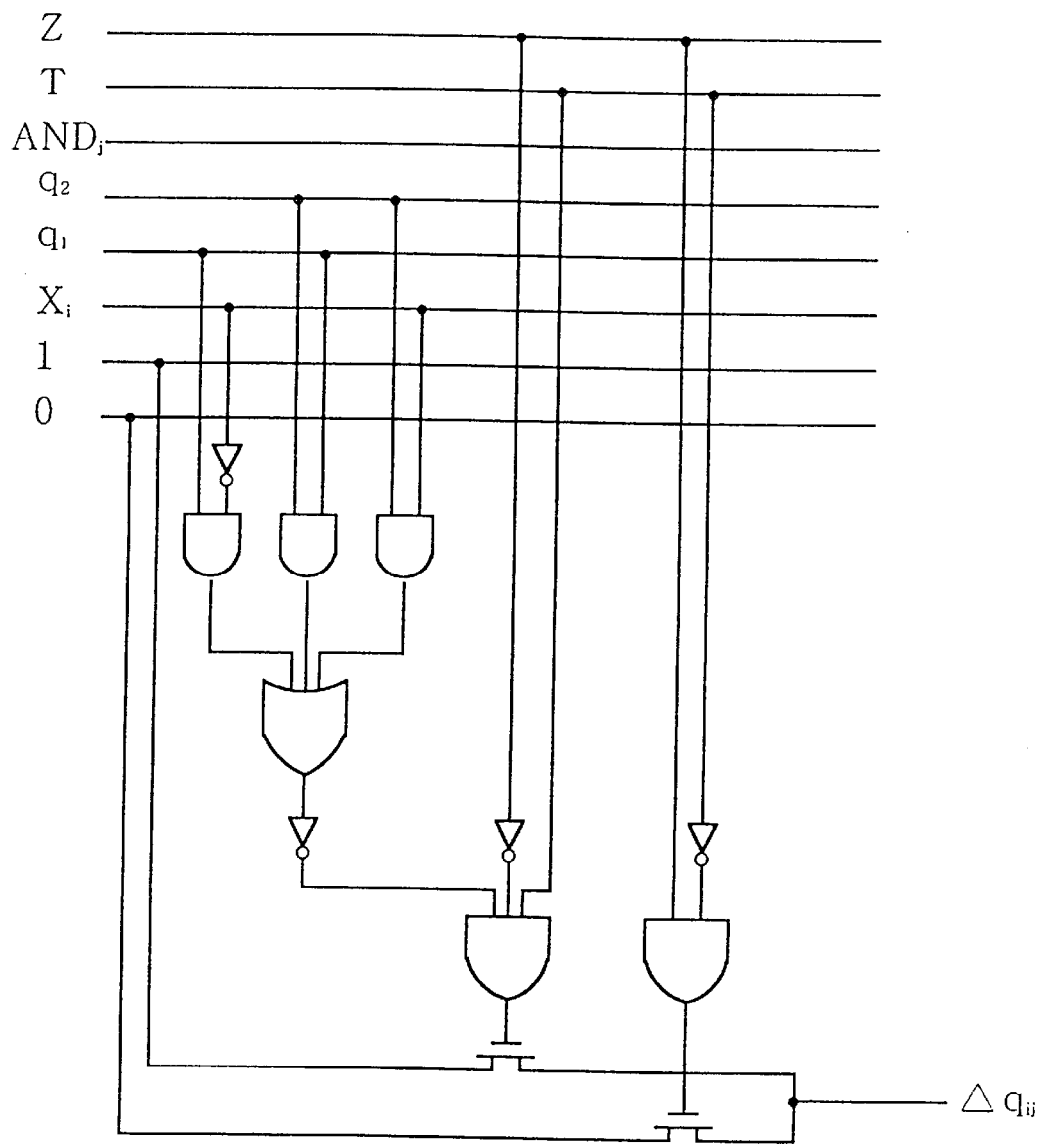
Fig. 38 Learning algorithm Circuit

Fig. 39 Truth table of connection state learning circuit

| $X_i$ | $\triangle q_{ij}$ | $q_2$ | $q_1$ | $q_2'$ | $q_1'$ |
|---|---|---|---|---|---|
| 0 | 0 | 0 | 0 | 0 | 0 |
| 0 | 0 | 0 | 1 | 1 | 0 |
| 0 | 0 | 1 | 0 | 0 | 0 |
| 0 | 0 | 1 | 1 | 0 | 1 |
| 0 | 1 | 0 | 0 | 1 | 0 |
| 0 | 1 | 0 | 1 | 1 | 1 |
| 0 | 1 | 1 | 0 | 0 | 1 |
| 0 | 1 | 1 | 1 | 1 | 1 |
| 1 | 0 | 0 | 0 | 0 | 0 |
| 1 | 0 | 0 | 1 | 0 | 0 |
| 1 | 0 | 1 | 0 | 0 | 1 |
| 1 | 0 | 1 | 1 | 1 | 0 |
| 1 | 1 | 0 | 0 | 0 | 1 |
| 1 | 1 | 0 | 1 | 1 | 0 |
| 1 | 1 | 1 | 0 | 1 | 1 |
| 1 | 1 | 1 | 1 | 1 | 1 |

Fig. 41 Connection circuit diagram
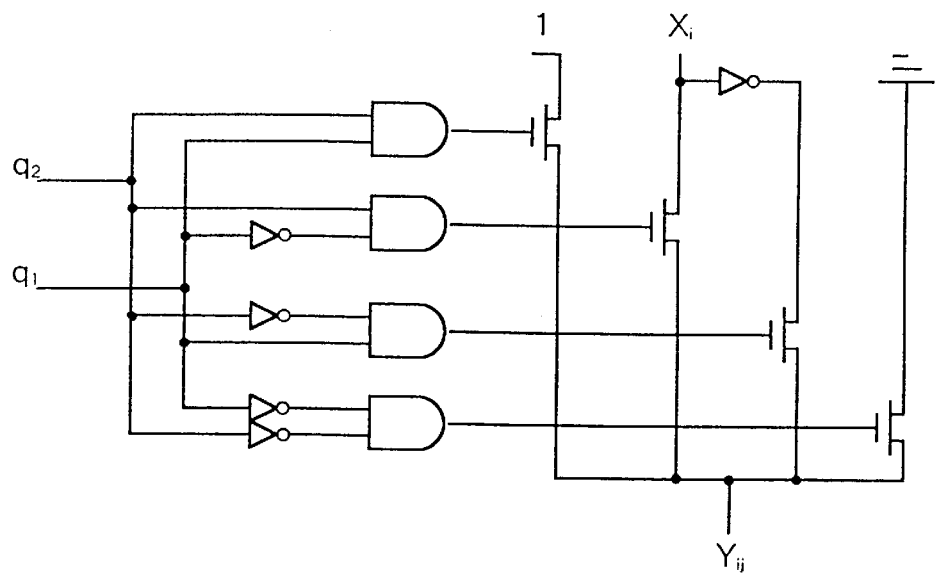
Fig. 42 Block diagram of the whole learning circuit by pseudo-potential energy method
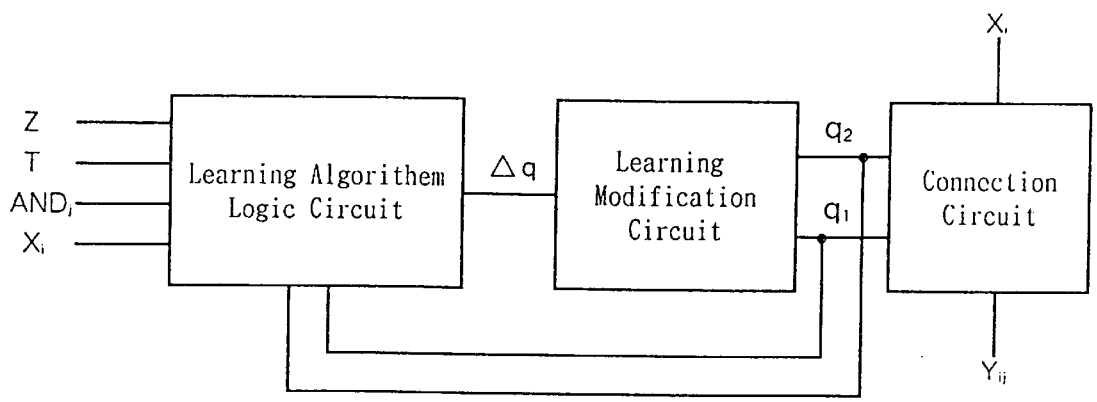

Fig. 43 Learning in sequential network
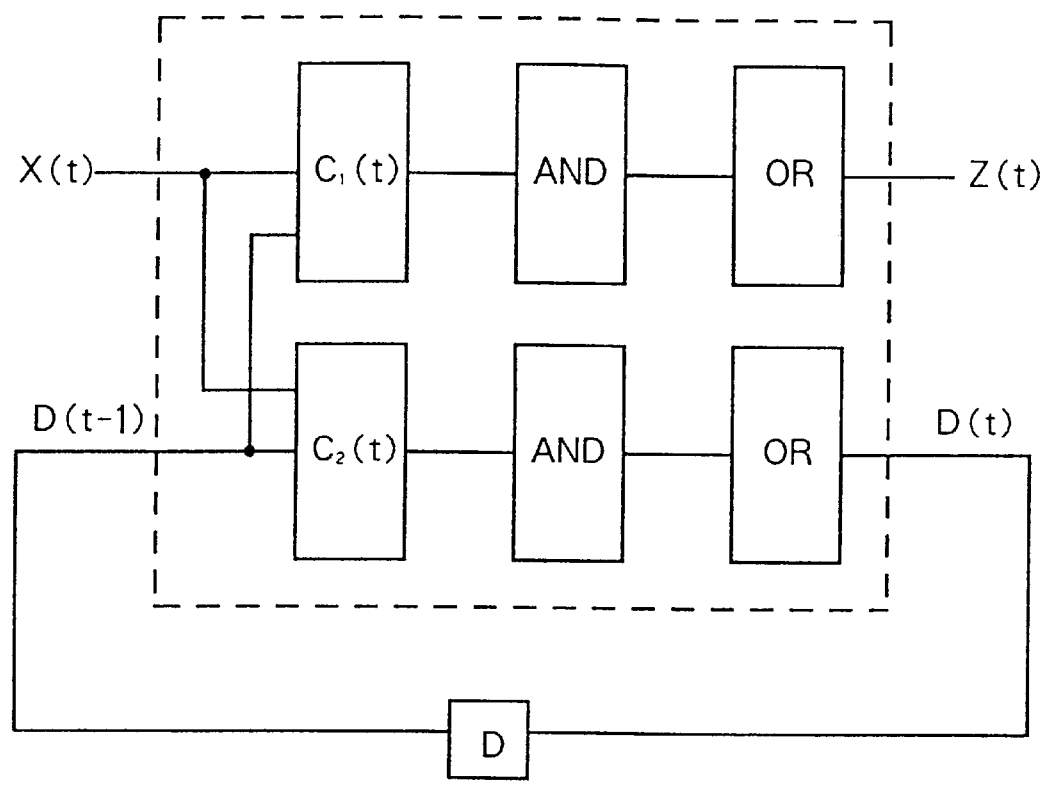

LEARNING METHODS IN BINARY SYSTEMS

BACKGROUND OF THE INVENTION

This invention relates to learnable binary systems.

Up to the present, learning in traditional neural networks is performed by modifying each weight of the process and threshold of each neuron. However, as the operations of the above-mentioned weights and thresholds require complicated and large-scale hardware such as adders and multipliers, and take a long time to operate, it was difficult to realize large-scale hardware.

The present invention is developed in consideration of the above drawback, and the object of this invention is to provide learning methods in binary systems, by modifying the connected states of the circuit in each of the basic binary circuits in binary combined logical and sequential circuits composed with basic binary gates such as AND, OR, NOT, NAND, NOR and EXOR gates.

BRIEF DESCRIPTION OF THE INVENTION

In order to attain the above object, in the learning methods in binary systems according to this invention, the learning is performed under the connected states, in which the first binary gate is connected to the second binary gate by selecting any one of the following four connected states:

1) directly connected;
2) connected through an inverter;
3) connected to the second gate input with binary 1;
4) connected to the second gate input with binary 0.

Energies showing the connecting conditions have high-low orders shown in FIG. 1.

Further, this learning is performed by modifying the pseudo-potential energies expressing the above connecting states.

Further, modification of the pseudo-potential energies showing above connected conditions is performed as shown in FIG. 2.

Further, the above-mentioned binary combined logical circuit is constructed with the connections between the basic binary gates such as AND, OR, NOT, NAND, NOR and EXOR gates as shown in FIG. 3.

Further, the above-mentioned sequential circuits are composed with the combined circuit and a memory circuit and the connection between them as shown in FIG. 4, and the combined circuit is constructed with the basic binary gates such as AND, OR, NOT, NAND, NOR and EXOR gates.

These learning methods are further characterized in that the above-mentioned connected states are realized by using neutrons.

These learning methods are still further characterized in that the learning is performed by modifying weights of the pseudo-neurons, and thresholds.

Further in these learning methods, the modification of weights of the neurons W and thresholds $\theta$ are changed towards the gradient descending direction of an error function E as shown in Eq.(1).

$$\Delta W \propto -\frac{\partial E}{\partial \theta} \qquad \text{Eq. (1)}$$

These learning methods are further characterized in that the above connected states are expressed by using a pseudo-potential energy (hereafter called PPE).

These learning methods are further characterized in that the PPE of each gate has a high-low order defined in FIG. 1.

These learning methods are further characterized in that learning is performed by modifying the PPE in the connected states.

These learning methods are further characterized in that the modification of the PPE in the connected states is performed as shown in FIG. 2.

These learning methods are further characterized in that the above binary combinational logic circuits are composed of the basic gates AND, OR, NOT, NAND, NOR and EXOR, and connections between them as shown in FIG. 3.

These learning methods are further characterized in that the above sequential networks consist of a combinational circuit and a memory circuit as shown in FIG. 4, and the combinational logic circuit is composed with the basic gates such as AND, OR, NOT, NAND, NOR and EXOR, and the connections between them.

Further, the above binary combinational logic circuits are characterized in that they are composed with an input layer, a connecting layer, an AND layer and an OR layer as shown in FIG. 5.

Further, the above binary combinational logic circuits are also characterized in that they are composed with an input layer, a connecting layer, an OR layer and AND layer as shown in FIG. 6.

Further, the above binary combinational logic circuits are also characterized in that they are composed with an input layer, a connecting layer, an intermediate NAND layer, and an outputting NAND layer as shown in FIG. 7.

Further, the above binary combinational logic circuits are also characterized in that they are composed with an input layer, a connecting layer, an intermediate NOR layer and an outputting NOR layer as shown in FIG. 8.

Furthermore, the above binary combinational logic circuits are also characterized in that they are composed with an input layer, a connecting layer, an intermediate EXOR layer and an outputting EXOR layer as shown in FIG. 9.

BRIEF DESCRIPTION OF THE DRAWINGS

In order to better understand the characteristics according to this invention, by way of example only and without being limitative in any way, the following preferred embodiment is described with reference to the accompanying drawings, in which:

FIG. 1 shows the order of pseudo-potential energy of connection states;

FIG. 2 shows the modification method of pseudo-potential energy of connection states;

FIG. 3 shows a block diagram of a combinational network;

FIG. 10 shows a truth table for an exampler binary function;

FIG. 11 shows a Karnaugh map for an exampler binary function;

FIG. 12 shows a logic circuit for an exampler binary function;

FIG. 13 shows a diagram of threshold function and model of the pseudo-neuron;

FIG. 14 shows the expression of the connection state with pseudo-neuron;

FIG. 18 shows a truth table of learning signals;

FIG. 19 shows a truth table of learning signals;

FIG. 20 shows a Karnaugh map of the threshold update $\Delta\theta_{ij}$;

FIG. 21 shows state assignment of the connection states by pseudo-neuron;

FIG. 22 shows a Karnaugh map of pseudo-neuron output ($Y_{ij}$) with input ($X_i$) and state assignment ($q_3$, $q_2$, $q_1$);

FIG. 23 shows circuit implementation of learning algorithm;

FIG. 26 shows a truth table for threshold learning circuit;

FIG. 27 shows a truth table for weight learning circuit;

FIG. 28 shows a truth table of weight and threshold modification circuits;

FIG. 29 shows a Karnaugh map of $q_3'$;

FIG. 30 shows a Karnaugh map of $q_2'$;

FIG. 31 shows a Karnaugh map of $q_1'$;

FIG. 37 shows a truth table of connection function;

FIG. 38 shows a learning algorithm circuit using pseudo-potential energy method;

FIG. 39 shows a truth table of connection state learning circuit;

FIG. 41 shows the diagram of connection circuit;

FIG. 42 shows a block diagram of the whole learning circuit using pseudo-potential energy method;

FIG. 43 shows learning in sequential network.

DETAILED DESCRIPTION OF THE INVENTION

Figure 4:
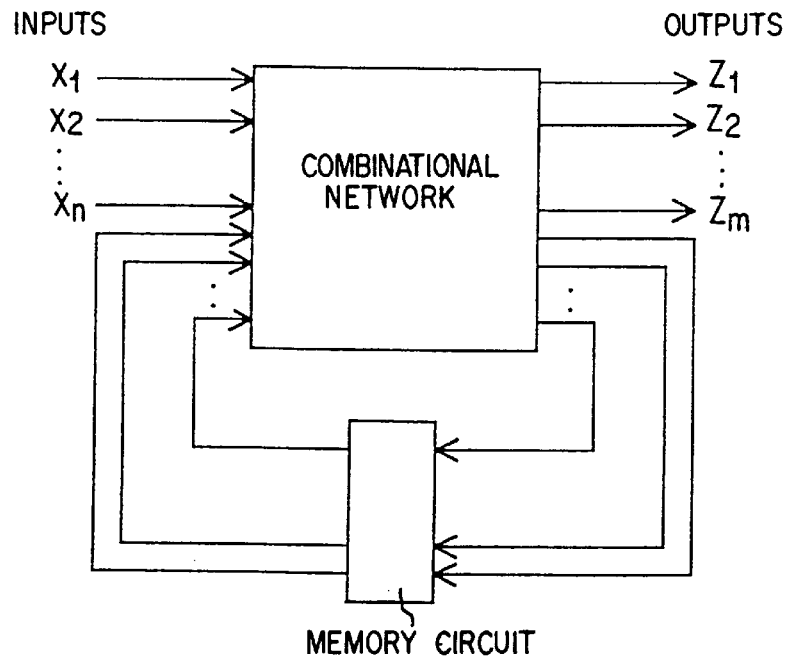
FIG. 4 shows a block diagram of a sequential network.

A preferred embodiment of the learning methods in binary systems according to this invention will be described in detail as an example with respect to the logic circuits composed with the AND layer and OR layer shown in FIG. 5.

1. Connected Conditions

At first, the connected conditions in the embodiment according to the invention are described. In composing binary systems, any logic function is expressed with logical sum form (composed with AND-OR circuit shown in FIG. 5). For example, a logic function shown in FIG. 10 becomes expressed in Eq.(2) by simplifying with a Karnaugh map shown in FIG. 11.

$$Z=\overline{X}_1 X_2+X_2\overline{X}_3+\overline{X}_2 X_3 X_4 \qquad \text{Eq.(2)}$$

The logic function shown in Eq.(2) is expressed in a block diagram shown in FIG. 12 by applying an AND-OR network.

Hereupon, the connecting states between an input layer and an AND layer are determined in any one of the following four connected states in accordance to the logic function, namely:

(1) Input $X_i$ is included in logic term $AND_j$ (for example, as $X_2$ shown in FIG. 12 is included both in $AND_1$ and $AND_2$, $X_2$ is directly connected);

(2) The negation of input $X_i$ is included in logic term $AND_j$ (for example, input $X_3$ is connected to $AND_2$ through an inverter);

(3) Input $X_i$ and negation of input $X_i$ are not included in logical product term $AND_j$ (for example, there is no connection between $X_3$ and $AND_1$. Namely, the input from $X_3$ to $AND_1$ is commonly connected to binary 1);

(4) Any input is commonly connected to AND gate with binary 0.

Accordingly, any logical function having n variables can be realized with an AND-OR network consisting of at most $2^{(n-1)}+1$ AND gates. The connections between input layer and AND layer are realized by applying any one of the above-mentioned connections.

2. Expression by Pseudo-Neuron

The above connected conditions can be expressed by applying a pseudo-neuron (hereinafter "PN"). The connected conditions between inputs and outputs in the pseudo-neuron are expressed with a threshold function shown in Eq.(3) or Eq.(4).

$$Y_{ij} = \frac{1}{1+e^{-(W_{ij}X_j-\theta_{ij})}} \qquad \text{Eq. (3)}$$

$$Y_{ij} = \begin{cases} 1 & (W_{ij}X_i \geq \theta_{ij}) \\ 0 & (W_{ij}X_i < \theta_{ij}) \end{cases} \qquad \text{Eq. (4)}$$

wherein, $X_i$: i-th input $Y_{ij}$: output of the ij-th pseudo-neuron $W_{ij}$: weight factor of input $X_i$ to the ij-th pseudo-neuron $\theta_{ij}$: the threshold of the ij-th pseudo-neuron.

Also in this case, the pseudo-neuron has only one input and one output, and $W_{ij}$ takes either 1 or −1, and $\theta_{ij}$ takes one among −1.5, −0.5, 0.5 or 1.5 as shown in FIG. 13(a) or (b).

As the input $X_i$ only takes either 0 or 1 in binary systems, the output from the pseudo-neuron takes either 1 or 0 in accordance to weight factor $W_{ij}$ and threshold $\theta_{ij}$ as shown in FIG. 14.

Accordingly, it becomes possible to express the connected condition between the input and the AND gate by applying one pseudo-neuron.

Figure 5:
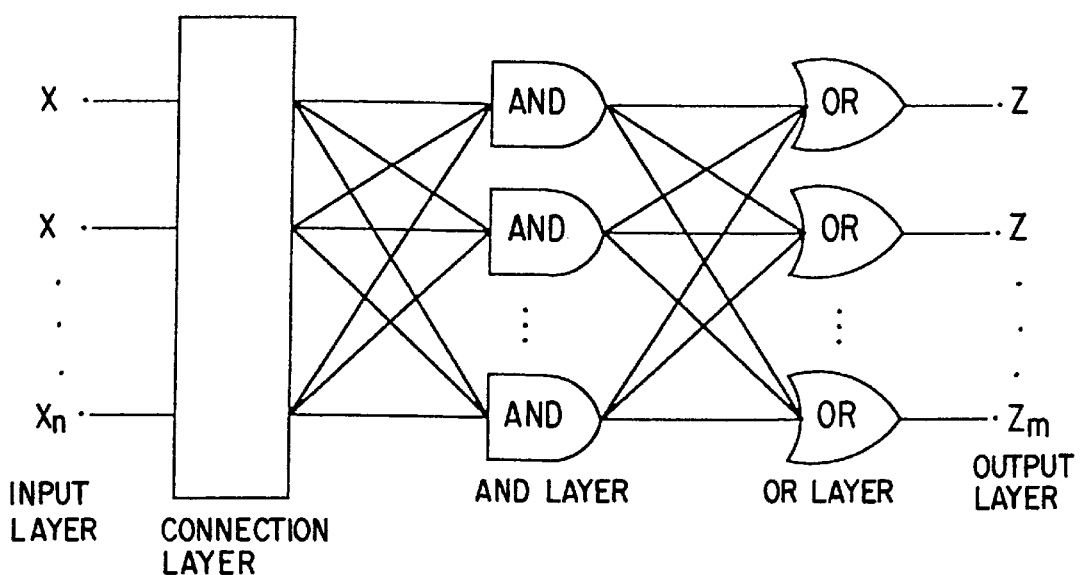
FIG. 5 shows a block diagram of an AND-OR network.
Figure 6:
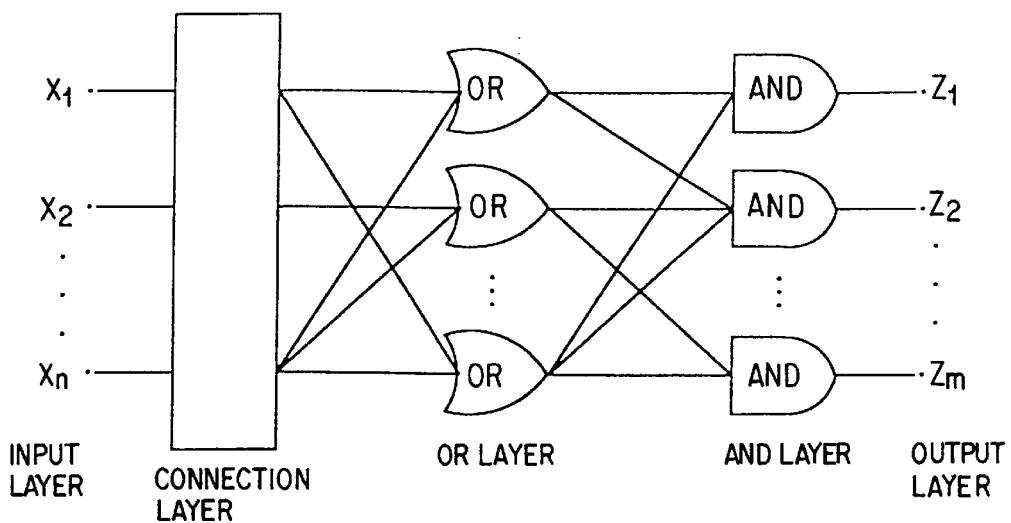
FIG. 6 shows a block diagram of an OR-AND network.
Figure 7:
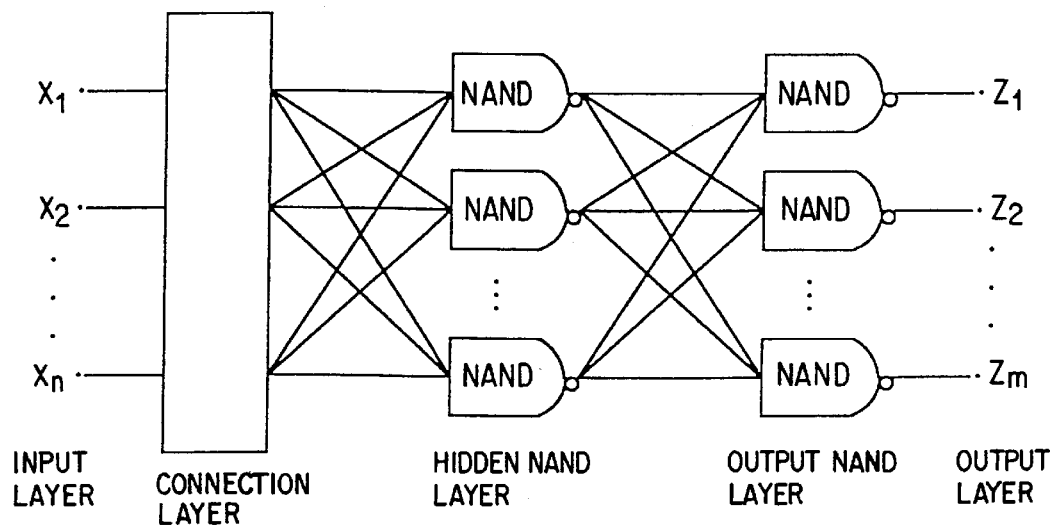
FIG. 7 shows a block diagram of a network by NAND gates.
Figure 8:
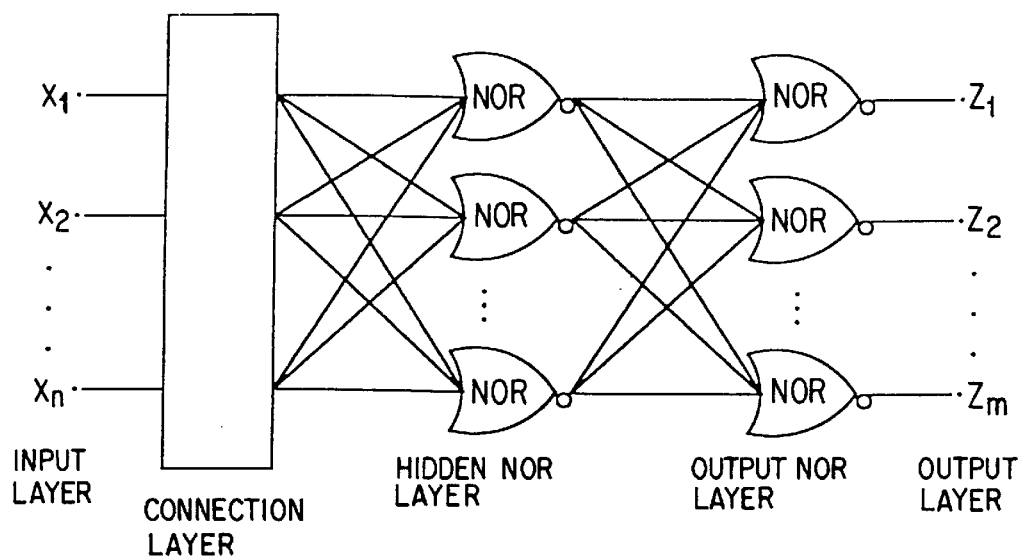
FIG. 8 shows a block diagram of a network by NOR gates.
Figure 9:
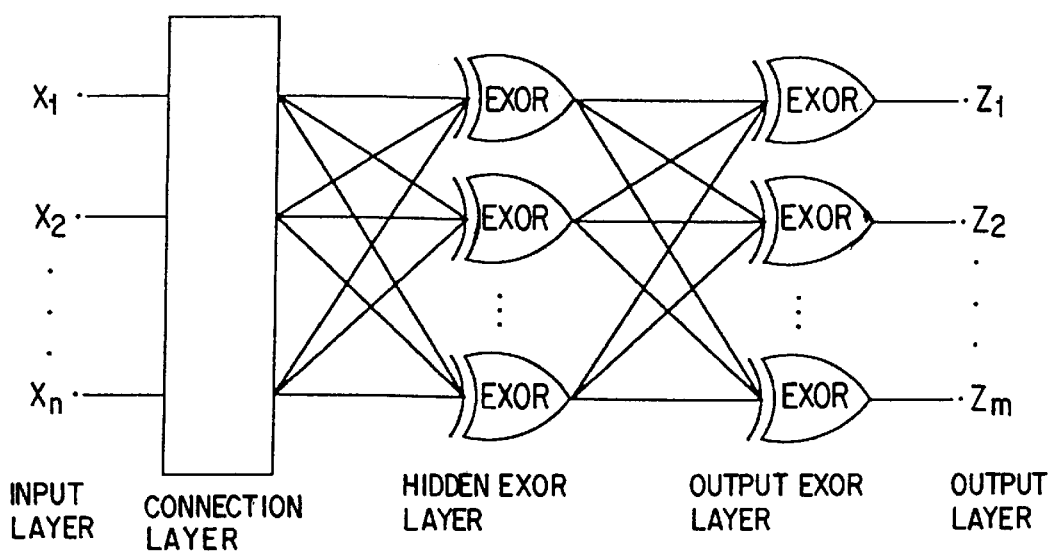
FIG. 9 shows a block diagram of a network by EXOR gates.
Figure 15:
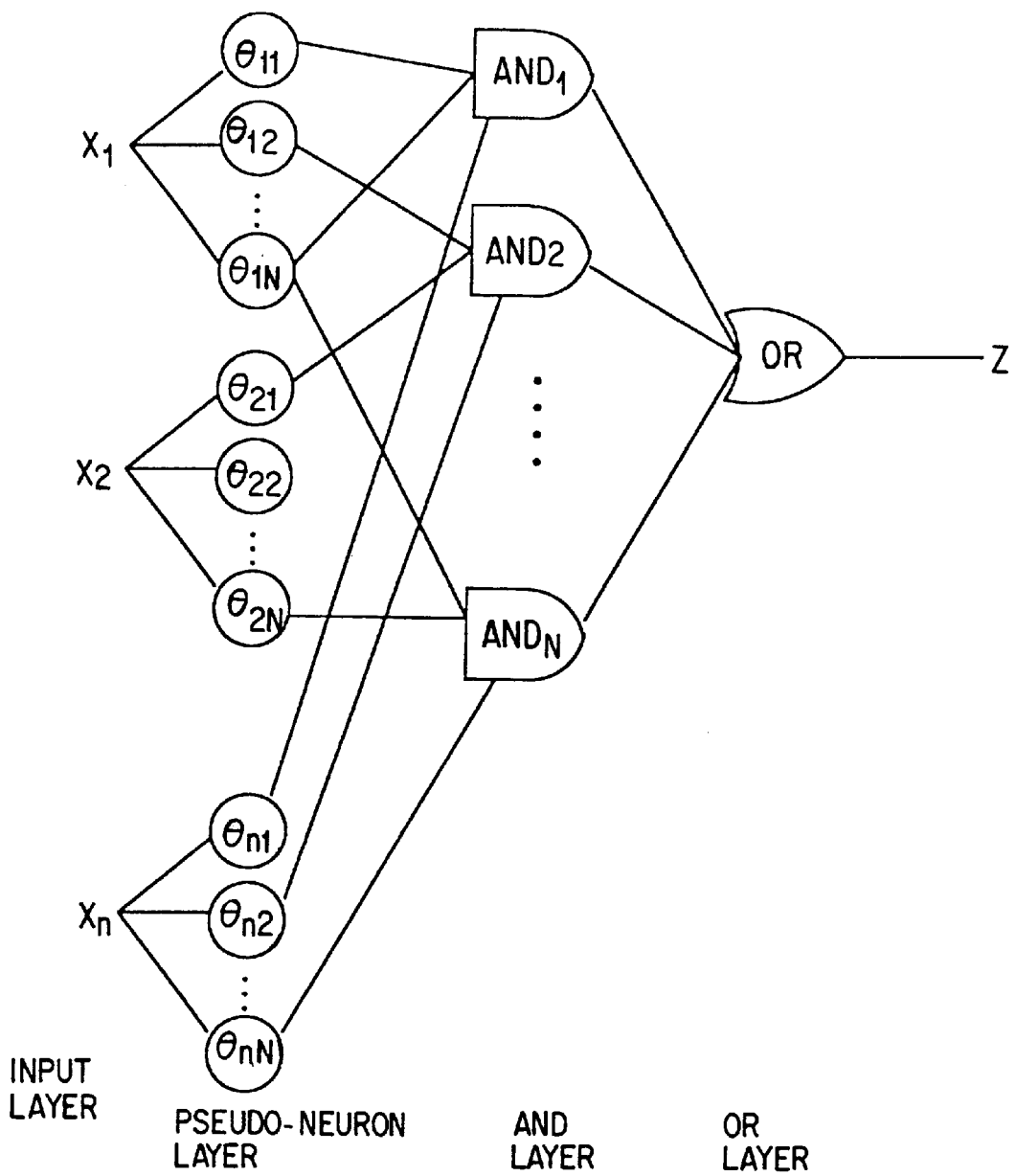
FIG. 15 shows one output AND-OR network with pseudo-neuron.

Then the AND-OR construction shown in FIG. 5 can be expressed as shown in FIG. 15 by applying a pseudo-neuron between input layer and AND layer.

The network shown in FIG. 15 is stratum-like which is composed of an input layer, a pseudo-neuron layer, an AND layer and an OR layer, and each layer is composed of adequate numbers of gates without any connection in each layer itself. Further, the connection between each layer is limited only in one direction (namely, a feed-forward type) from one input layer to output layer. In gates of each layer excepting the connection between any input layer and any pseudo-neuron layer, the connection with the forwardly placed gate is specified as binary 1.

If the response function of the PN is approximated by a sigmoid function, and AND, OR gates are approximated by continuous valued minimum, maximum functions, many algorithms, for example, such as the error back propagation method, can be used. However, modification or learning is performed only by applying weights and thresholds of the PN.

3. Gradient Descent Learning Algorithm

A learning algorithm for connected conditions between input layer and AND layer in the binary system is derived as follows.

In considering a network shown in FIG. 5, de sired outputs or the teacher's signals are supposed, as $T_1$, $T_2$, ... $T_m$ for the given inputs $X_1$, $X_2$, ... $X_n$, and the outputs of the network shown in FIG. 5 are supposed as $Z_1$, $Z_2$, ... $Z_m$, and an error function E is defined as sumn of squares, as shown in Eq.(5).

$$E = \frac{1}{2}\sum_{i=1}^{m}(Z_i - T_i)^2 \quad \text{Eq. (5)}$$

Learning is performed so that the error will be decreased by changing weights (connected conditions) between the input layer and PN layer, and thresholds of PNs (all other connections are fixed). Herein, in letting the weights W and the thresholds $\theta$ change towards gradient descent direction, the correction values of $\Delta W$ and $\Delta \theta$ are expressed by Eq.(6).

$$\Delta W = -\varepsilon_W \frac{\partial E}{\partial W} \quad \text{Eq. (6)}$$

$$\Delta \theta = -\varepsilon_\theta \frac{\partial E}{\partial \theta}$$

In Eq. (6), $\epsilon_W$ and $\epsilon_\theta$ are defined to take only positive values. For simplification, one network requiring only one output shown in FIG. 15 is considered.

In letting $\theta_{ij}$ denote the ij-th PN between input $X_i$ and j-th AND gate $AND_j$ and further letting $Y_{ij}$, $\theta_{ij}$, $W_{ij}$ denote its output, threshold and weight, the correction values $\Delta W_{ij}$ and $\Delta \theta_{ij}$ are expressed as shown in the following formulas Eq.(7).

$$\Delta W_{ij} = -\varepsilon_W \frac{\partial E}{\partial W_{ij}} = -\varepsilon_W \frac{\partial E}{\partial Z} \cdot \frac{\partial Z}{\partial OR} \cdot \frac{\partial OR}{\partial AND_j} \cdot \frac{\partial AND_j}{\partial Y_{ij}} \cdot \frac{\partial Y_{ij}}{\partial W_{ij}} \quad \text{Eq. (7)}$$

$$\Delta \theta_{ij} = -\varepsilon_\theta \frac{\partial E}{\partial \theta_{ij}} = -\varepsilon_\theta \frac{\partial E}{\partial Z} \cdot \frac{\partial Z}{\partial OR} \cdot \frac{\partial OR}{\partial AND_j} \cdot \frac{\partial AND_j}{\partial Y_{ij}} \cdot \frac{\partial Y_{ij}}{\partial \theta_{ij}}$$

Herein, as error function E is express in Eq.(8), $$E = \frac{1}{2}\sum_{i=1}^{m}(Z_i - T_i)^2 = \frac{1}{2}(Z - T)^2 \quad \text{Eq. (8)}$$

then, the following Eq.(9) is concluded.

$$\frac{\partial E}{\partial Z} = Z - T \quad \text{Eq. (9)}$$

Further, Eq.(10) is deducted as Z=OR.

$$\frac{\partial Z}{\partial OR} = 1 \quad \text{Eq. (10)}$$

Accordingly, each OR gate is approximated by following continuous functions shown in Eq.(11).

$$OR = \begin{pmatrix} M & (AND_j < M) \\ AND_j & (AND_j \geq M) \end{pmatrix} \quad \text{Eq. (11)}$$

In FIG. 11, M is maximum of the input excepting $AND_j$. Namely,

M=Max ($AND_i$, i=1,2, ... , i≠j)

Figure 16:
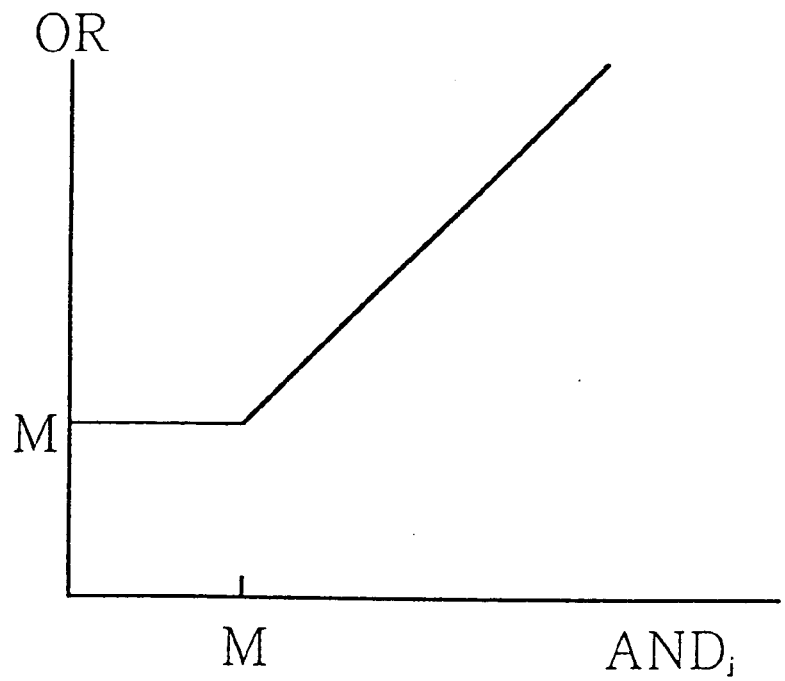
FIG. 16 shows a continuous valued function approximated to OR gate.

This relation is expressed in FIG. 16.

Accordingly, this relations is expressed as shown in Eq.(12).

$$\frac{\partial OR}{\partial AND_j} = \text{Sgn}(AND_j - M) = \begin{pmatrix} 0 & (AND_j < M) \\ 1 & (AND_j \geq M) \end{pmatrix} \quad \text{Eq. (12)}$$

In the same manner, it is possible to approximate as shown in Eq.(13) in each AND gate facing each of input.

$$AND_j = \begin{pmatrix} Y_{ij} & Y_{ij} \leq m \\ m & Y_{ij} > m \end{pmatrix} \quad \text{Eq. (13)}$$

Herein, m is the minimum of all inputs excepting $Y_{ij}$. Namely, m=Min ($Y_{ik}$, k=1,2, ... , k≠j)

Figure 17:
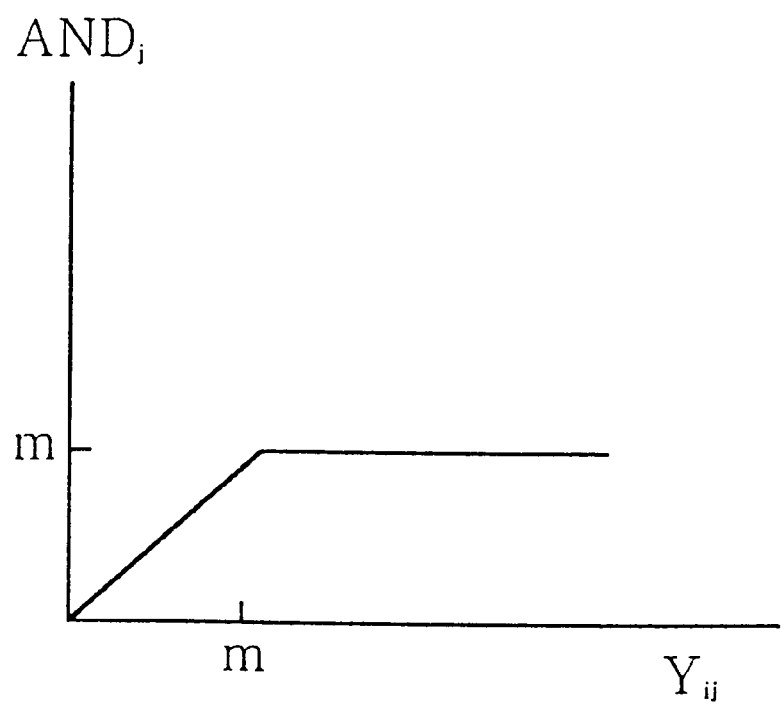
FIG. 17 shows a continuous valued function approximated to AND gate.

This relation is expressed in FIG. 17.

Accordingly, this relation is expressed as shown in Eq. (14).

$$\frac{\partial AND_j}{\partial Y_{ij}} = \text{Sgn}(m - Y_{ij}) = \begin{pmatrix} 1 & Y_{ij} \leq m \\ 0 & Y_{ij} > m \end{pmatrix} \quad \text{Eq. (14)}$$

Finally, as $Y_{ij}$ is expressed as shown in Eq.(15), $$Y_{ij} = f(x) = \frac{1}{1+e^{-x}} \quad \text{Eq. (15)}$$

$$X = W_{ij}X_i - \theta_{ij}$$

then Eq.(16) is deducted as follows.

$$\frac{\partial Y_{ij}}{\partial W_{ij}} = f'(x) \cdot X_i \quad \text{Eq. (16)}$$

$$\frac{\partial Y_{ij}}{\partial \theta_{ij}} = f'(x) \cdot (-1)$$

because $f'(x) \geq 0$, then in assuming that $f'(x)=1$, $\Delta W_{ij}$ and $\Delta \theta_{ij}$ come to satisfy the following equations.

$$\Delta W_{ij} = -\epsilon_W(Z-T)\text{Sgn}(AND_j-M)\text{Sgn}(m-Y_{ij})X_i$$

and $$\Delta\theta_{ij} = -\epsilon_\theta(Z-T)\text{Sgn}(AND_j-M)\text{Sgn}(m-Y_{ij}) \quad (-1)$$

then assuming that $\epsilon_W=2$, $\epsilon_\theta=1$,
upper relations are reduced to follow.

$$\Delta W_{ij} = -2(Z-T)\text{Sgn}(AND_j-M)\text{Sgn}(m-Y_{ij})X_i$$

$$\Delta\theta_{ij} = (Z-T)\text{Sgn}(AND_j-M)\text{Sgn}(m-Y_{ij})$$

In the above equations representing $\Delta W_{ij}$ and $\Delta\theta_{ij}$, as all the quantities are expressed in binary systems, then quantities to be corrected, $\Delta W_{ij}$ and $\Delta\theta_{ij}$ have respectively simple logic relations with output Z, teacher's signal T, output of the AND gate $AND_j$, output of the PN, $Y_{ij}$ and input $X_i$.

Therefore, the learning rules can be realized with logic circuits. The modification is limited to 1,−1 or 0 which represent that current weights and thresholds are increased, decreased or held as much as one unit, and the one unit is defined as 1 for weights and 2 for thresholds.

Implementation of Hardware (1) Hardware Implementation in Learning Algorithm

As mentioned above, the learning algorithm is composed only with logical operations between inputs, output signals, teacher's signals, outputs from AND layers and outputs from PNs, and gives a learning signal against PNs whether to increase or to decrease or to hold respective weights and thresholds.

Hereupon, as there are three conditions, namely increasing, decreasing or holding, then if letting the holding signal be q=HP (high impedance), increasing and decreasing signals are expressed respectively as q=1 and q=0. Thus, the learning signals for weights and thresholds shown by Eqs. (17) and (18) may be represented as a truth table shown in FIGS. 18 and 19.

$$\Delta\theta_{ij}(1) = Z \cdot \overline{T} \cdot AND_j \quad \text{Eq. (17)}$$

$$\Delta\theta_{ij}(0) = \overline{Z} \cdot T \cdot \overline{Y}_{ij}$$

$$\Delta W_{ij}(1) = \overline{Z \cdot \overline{T} \cdot AND_j} \cdot X_i = \overline{\Delta\theta_{ij}(1)} \cdot X_i \quad \text{Eq. (18)}$$

$$\Delta W_{ij}(0) = \overline{\overline{Z} \cdot T \cdot \overline{Y}_{ij}} \cdot X_i = \overline{\Delta\theta_{ij}(0)} \cdot X_i$$

As these truth tables (FIGS. 18 and 19) are capable of being expressed in the Karnaugh map, then the Karnaugh map including even the don't care terms is expressed by FIG. 20. The logic function of the learning signals is possible to be deducted from these truth tables.

Accordingly, the modifications of the weights and thresholds are determined by input $X_i$, output Z, output from PN ($Y_{ij}$), $AND_j$ and teacher's signal T. Then, allocating the connected conditions (8 conditions) of the PN shown in FIG. 14 to the conditions shown in FIG. 21 by applying 3 bits ($q_3$, $q_2$, $q_1$), the logic function composed of the output of the PN, inputs and variables ($q_3$, $q_2$, $q_1$) is expressed by Karnaugh map shown in FIG. 22, further following Eq.(19) is obtained from that Karnaugh map.

$$Y_{ij} = \overline{X}_i\overline{q}_2 + \overline{q}_2\overline{q}_1 + \overline{q}_3\overline{q}_2 + X_i\overline{q}_3\overline{q}_1 \quad \text{Eq. (19)}$$

Using MOS transistor switches, the logic circuit for the learning signals shown in Eqs.(17) and (18) is expressed as shown in FIG. 23, and the logic circuit shown in FIG. 23 gives 0 or 1 or HP according to the above-described learning algorithm.

(2) Circuits modification weights and thresholds.

Figure 24A:
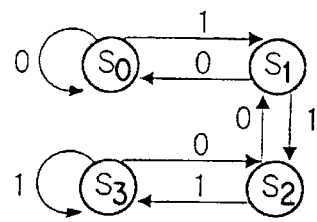
FIG. 24(a) shows the state transition diagram of threshold learning $\Delta\theta$.
Figure 24B:
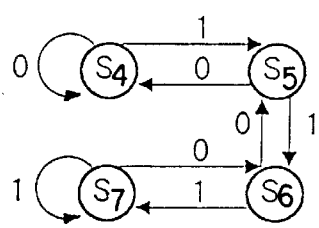
FIG. 24(b) shows a state transition diagram of weight learning $\Delta W$.
Figures 24C, 25A, 25B:
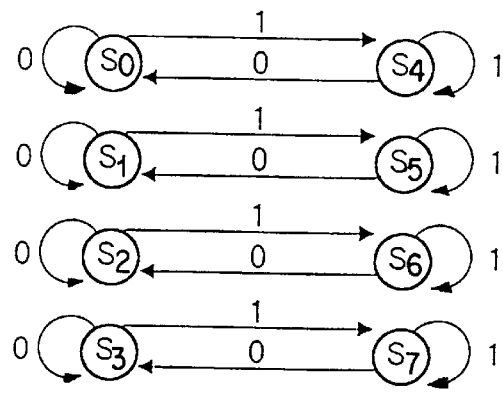
FIG. 24(c) shows a state transition diagram of combined weight of threshold learning.
FIG. 25(a) shows a state transition table of threshold learning.
FIG. 25(b) shows a state transition table of weight learning.

By applying the state variables connecting each PNs as shown in FIG. 21, operations of the modifying circuits for weights and thresholds by the learning algorithm can be represented as a state diagram and a state transition table shown in FIGS. 24 and 25, respectively.

Rewriting FIGS. 24 and 25 further into the truth tables shown in FIGS. 26 and 27, the state transition functions are expressed as shown in Eq.(20).

$$q'_3 = q_3 \quad \text{Eq. (20)}$$

$$q'_2 = q_2q_1 + \Delta\theta_{ij}q_1 + \Delta\theta_{ij}q_2$$

$$q'_1 = q_2\overline{q_1} + \Delta\theta_{ij}\overline{q_1} + \Delta\theta_{ij}q_2$$

or expressed as follows:

$$q_3'^1 = \Delta W_{ij}$$

$$q_2'^1 = q2$$

$$q_1'^1 = q1$$

combining both weights and thresholds, it yields a truth table shown in FIG. 28.

The Karnaugh map for $q_3'$, $q_2'$, and $q_1'$ is expressed in FIGS. 29, 30 and 31, respectively, and the following equations Eq.(21) are obtained.

$$q'_3 = \Delta W_{ij} \quad \text{Eq. (21)}$$

$$q'_2 = \Delta\theta_{ij}q_1 + \Delta\theta_{ij}q_2 + q_2q_1$$

$$q'_1 = q_2\overline{q_1} + \Delta\theta_{ij}q_2 + \Delta\theta_{ij}\overline{q_2}\,\overline{q_1}$$

Figure 32:
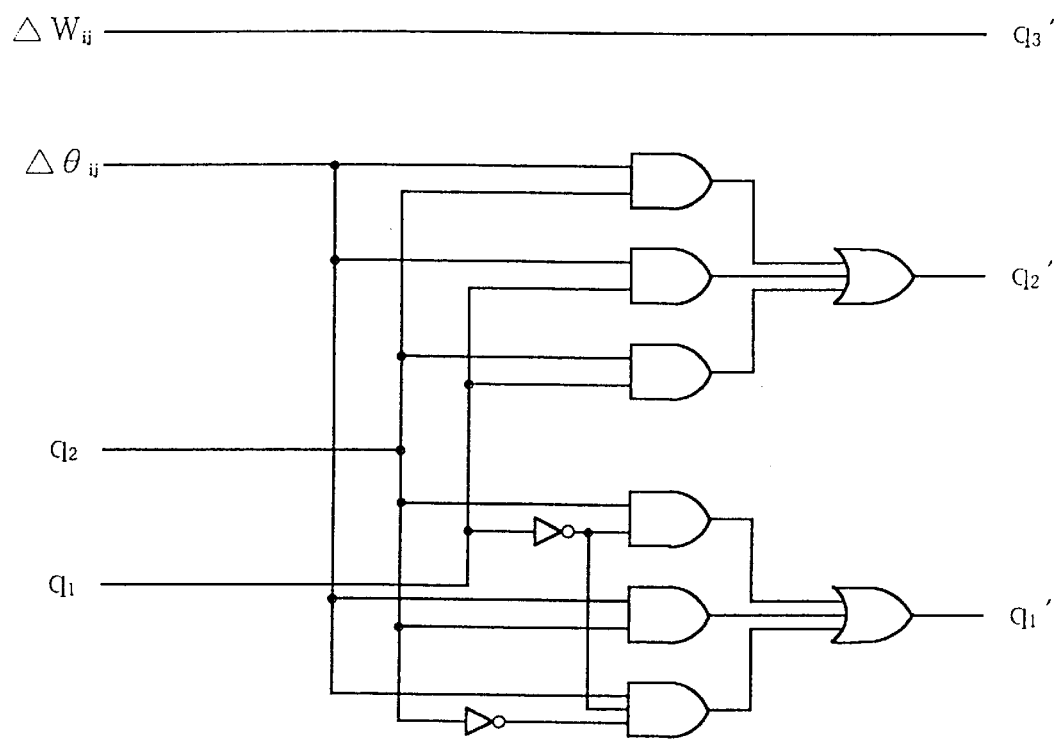
FIG. 32 shows a modification circuit diagram using a combinational network.

Further, the circuit of them is expressed in FIG. 32.

Figures 33, 34:
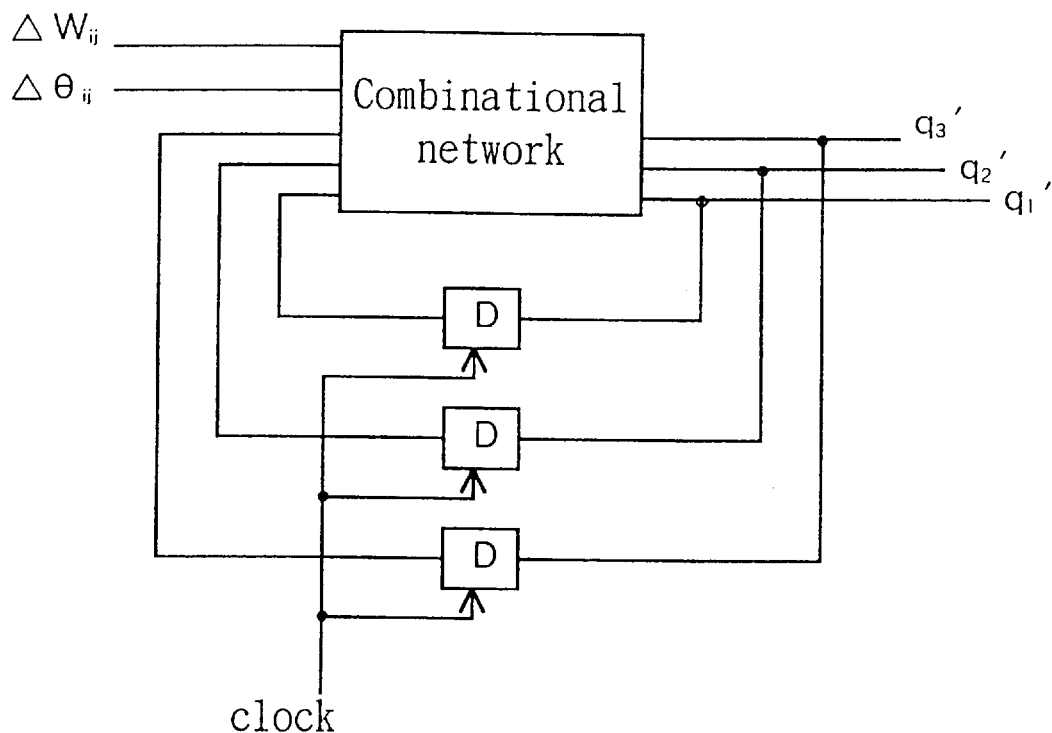
FIG. 33 shows a modification circuit diagram using sequential network.
FIG. 34 shows a truth table of pseudo-neuron connecting circuit.

Using D flip-flops as memory devices, the learning circuit is expressed as shown in FIG. 33.

Herein, denoting S(1), S(x), S(1−x) and S(0) as 1-connected, direct-connected, inverter-connected and 0-connected states of the connected states of a PN, respectively, the truth table of the connecting function is expressed as shown in FIG. 34. By applying this truth table shown in FIG. 34, the following logic functions shown in Eq.(22) are obtained.

$$S(1) = \overline{q_3}\,\overline{q_2} + \overline{q_2}\,\overline{q_1} \quad \text{Eq. (22)}$$

$$S(X) = \overline{q_3}\,q_2\,\overline{q_1}$$

$$S(1-X) = q_3\overline{q_2}q_1$$

$$S(0) = q_2q_1 + q_3q_2$$

Figure 35:
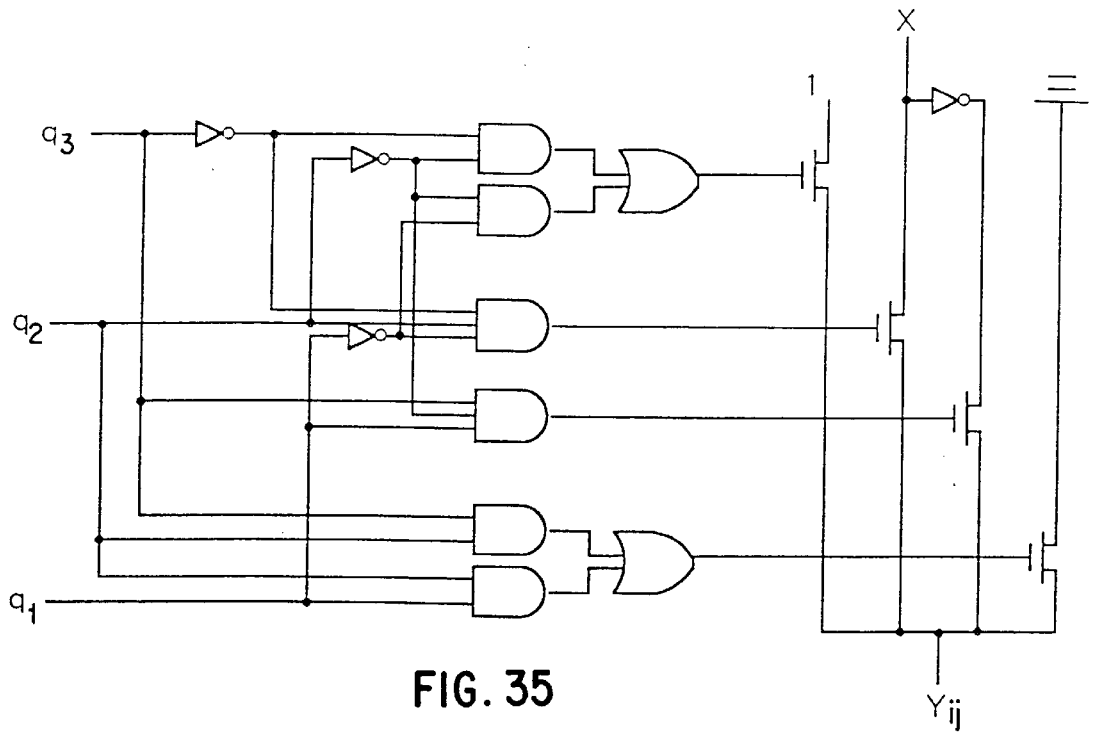
FIG. 35 shows a circuit of the pseudo-neuron connection.
Figure 36:
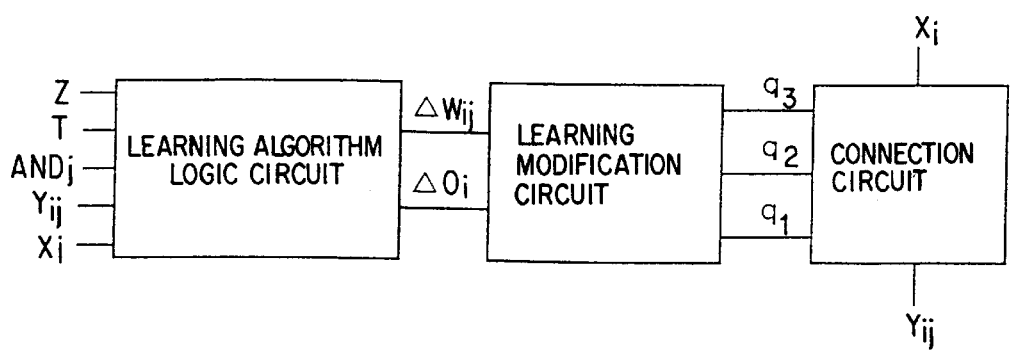
FIG. 36 shows a block diagram of the whole learning circuit.

Accordingly, the connecting circuit is expressed as shown in FIG. 35, and the block diagram of the whole learning circuits using PN is shown in FIG. 36.

3. Learning Algorithm and its Implementation Applied with Pseudo-Potential Energy Method.

Herein, learning algorithms applied with pseudo-potential energy method (hereafter referred to as PPE method) is described in order for composing internal model (connected state between input layer and AND layer) in an AND-OR binary system shown in FIG. 5.

As mentioned above, there are four connected states composed with 1-connected, direct-connected, inverter-connected and 0-connected.

Hence, each connected state is defined by applying the pseudo-potential energy. Further, the order from high to low of the pseudo-potential energy is assumed as follows. For 0-input, (1) 1-connected, (2) inverter-connected, (3) direct-connected, (4) 0-connected; and for 1-input, (1)

1-connected, (2) direct-connected, (3) inverter-connected and (4) 0-connected.

In considering the quasi-potential energy defined as above mentioned, it shall be noted that the higher the defined pseudo-potential energy, the more easily the connected state gives 1-output. Inversely, the lower the energy, the more easily the connected states give 0-output. Therefore, when wishing for output of 1-output, it is necessary to change the current pseudo-potential energy to a higher state. Inversely, when wishing for output of 0-output, it is necessary to change the energy to a lower state. The learning is to allow the output of the network to coincide with the teacher's signal, and then learning is attained by modifying the quasi-potential energy of the connection. Herein, an AND-OR network shown in FIG. 5 is considered.

When the teacher's signal equals 1, output Z equals 0, and the output of all AND. becomes 0. In order to let the output Z be 1, it is necessary to shift state (2) or (3) for 0-input, and state (3) or (4) for 1-input to state (2) or state (3) having higher quasi-potential energies, only when inputting $AND_j$, namely $Y_{ij}$ equals 0. In state (1) and state (2), as binary 1 is already output, state (1) and state (2) are accordingly maintained.

When the teacher's signal T is 0, and output T=1, at least one output of $AND_j$ keeps to output binary 1. To allow the output to be in binary 0, it is required to let all $AND_j$ gates outputting binary 1 output binary zeros. As the $AND_j$ outputs binary 1, it means that the connected state of the $AND_j$ gate is in state (1) or (2) having higher potential energy. Accordingly, letting the output be in binary 0, it is necessary to shift states (1) or (2) having higher potential energies to states (2) or (3) having lower potential energies.

Based on the above, it becomes possible to obtain the following learning signals shown in Eq.(23).

$$\Delta q_{ij} = \begin{cases} 1 & T \cdot \overline{Z} \cdot \overline{Y}_{ij} = 1 \\ 0 & \overline{T} \cdot Z \cdot AND_j = 1 \\ HP & \text{otherwise} \end{cases} \quad \text{Eq. (23)}$$

Herein, letting S(1), S(x), S(1−x) and S(0) denote 1-connected, directly-connected, inverter-connected, and 0-connected states of a pseudo-neuron, and allocating 11, 10, 01, 00 to each of the above four connected states by applying 2 bits ($q_2$, $q_1$) binary code. The logical relation between $Y_{ij}$ and current states $q_2q_1$, input $X_i$ is expressed by the truth table shown in FIG. 37, and further the logical relation thereof is expressed by the following Eq.(24).

$$Y_{ij} = q_1\overline{X}_i + q_2 X_i \quad \text{Eq. (24)}$$

Also, network of the learning algorithms is shown in FIG. 38.

With the state variables defined as above, the truth table for the combinational network in the sequential network can be expressed in FIG. 39. Thus, the state transition function can be obtained from Eq.(25).

$$q'_2 = \Delta q_{ij} q_1 + \overline{X}_i \Delta q_{ij} \overline{q_2} + \overline{X}_i q_2 q_1 + X_i q_2 q_1 + X_i q_2 q_1 + X_i \Delta q_{ij} q_2 \quad \text{Eq. (2)}$$

$$q'_1 = \Delta q_{ij} q_2 + X_i \Delta q_{ij} \overline{q_1} + \overline{X}_i \Delta q_{ij} \overline{q_1} + \overline{X}_i q_2 q_1 + X_i q_2 \overline{q_1}$$

Figure 40:
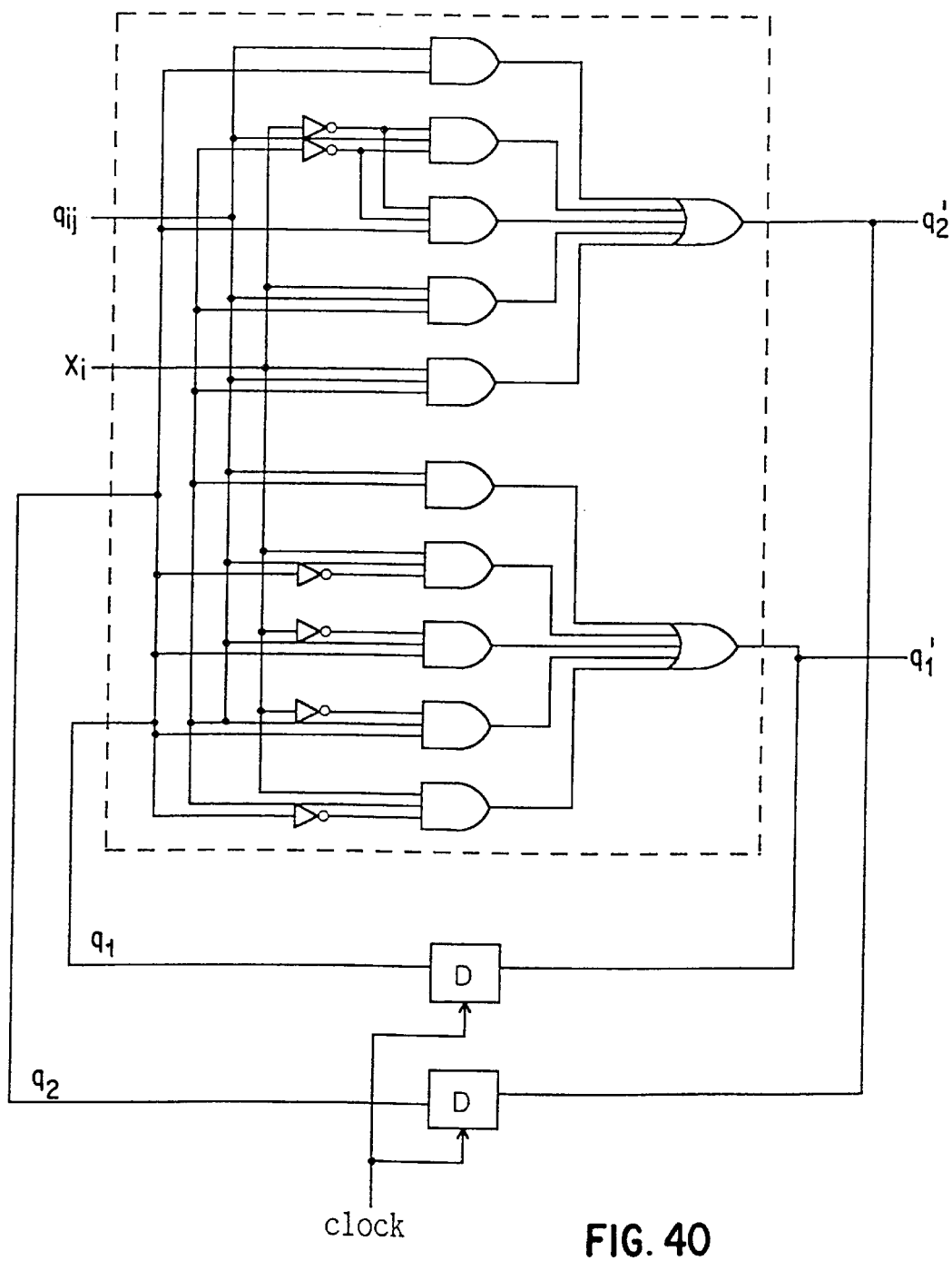
FIG. 40 shows a learning modification circuit using sequential network.

Next, by using D flip-flops as memory devices, the learning modification circuit can be realized with a circuit as shown in FIG. 40. The connected circuit also can be realized with a circuit as shown in FIG. 41. Finally, the block diagram of the whole learning circuit using the pseudo-potential energy method is shown in FIG. 42.

Similarly, it is possible to increase the internal states, or to cycle state transitions. Further, it is also possible to use general CPU, RAM to realize the teaching.

(4) Learning Method in Sequential Network

Herein, the learning method for composing sequential network.

As mentioned above, a binary system for example, a system shown in FIG. 5 is a multi-layered feed forward network consisting of a connecting layer, an AND layer, an OR layer.

Using letter X for input, letter C for connecting function and Z for output, output Z is expressed as follows:

$$Z = f(C, X)$$

The learning is to change the connecting function C by applying gradient descent method or pseudo-potential energy method.

For example, a sequential network composed of a combinational network with a connecting layer, an AND layer, an OR layer, and a memory network with D flip-flops is considered.

The sequential network can be represented as the following equations.

$$Z(t) = F(C_1(t), X(t), D(t-1))$$

$$D(t-1) = f(C_2(t-1), x(t-1), D(t-2))$$

Thus, $$Z(t) = f(C_1(t), X(t), C_2(t-1), X(t-1), D(t-2))$$

wherein $C_1(t)$, $C_2(t)$ are connection functions at the time of step t, and

X(t), Z(t) and D(t) are input, output and internal states at the time of step t, respectively.

Therefore, the learning can be performed by modifying connection functions $C_1(t)$, $C_2(t-1)$ by gradient descent method or pseudo-potential energy method.

It is notable that the learning is not only dependent on input X(t) and output Z(t) at time step t, but also input X(t−1) at time step (t−1) and internal state D(t−2). Thus, $$C_1(t+1) = C_1(t) + \Delta C_1$$

$$C_2(t) = C_2(t-1) + \Delta C_2$$

wherein $\Delta C_1$ and $\Delta C_2$ are the quantities to be modified.

The internal state D(t) at time step t can be calculated by the following equation.

$$D(t) = f(C_2(t), X(t), D(t-1))$$

As described above in detail, in the learning method in binary systems according to this invention, the first binary gate and the second binary gate are defined as one of gates comprising OR, AND, NOR, NAND and EXOR gate, and the first gate is connected to the second gate in any one state among the following four connected states composed with:

(1) directly connected;
(2) connected through an inverter;
(3) binary 1-inputted to the second gate;
(4) binary 0-inputted to the second gate.

In this binary system, the learning is performed by selecting any one connected state among the above four states.

Further, in the learning method in binary systems according to this invention, an input is connected to any one gate among OR, AND, NOR, NAND and EXOR gate in any one state among the following four connected states composed with:

(1) directly connected;
(2) connected through an inverter;
(3) binary 1-inputted to the gate;
(4) binary 0-inputted to the gate.

In this binary system, the learning is performed by selecting any one connected state among the above four states.

Further, in the learning method in binary systems according to this invention, current inputs and internal states expressing the past sequence of values of the inputs are connected to any one gate among OR, AND, NOR, NAND and EXOR gates in any one state among the following four connected states composed with:

(1) directly connected;
(2) connected through an inverter;
(3) binary 1-inputted to the gate;
(4) binary 0-inputted to the gate.

In this binary system, the learning is performed by selecting any one connected state among the above four states.

Further, in the learning method in binary systems according to this invention, connection between above first binary gate or an input and the second binary gate is constructed so as to select any one state among the above four connected states, at least according to the computed result between the input signal into the first binary gate and the teacher's signal for learning.

Further, in the learning method in binary systems according to this invention, by providing a pseudo-neuron Q defined as follows, between the above-mentioned first binary gate (or an input), and the second binary gate, the connection between the first binary gate (or input) and the second binary gate is defined by the pseudo-neuron Q and the selection of the connection (i.e., the learning) is carried out by modifying weights and thresholds of the pseudo-neuron Q.

Herein, the pseudo-neuron Q is defined as $Q=f(WX,\theta)$: wherein, f: a threshold function, or a sygmoid function or a partial linear function;

X: the input signal into the pseudo-neuron Q from the first binary gate;

W: the weight between the input and the pseudo-neuron Q;

$\theta$: the threshold of the pseudo-neuron Q.

Further, in the learning method in binary systems according to this invention, the systems are comprised with an input layer letting a plural of binary input data input, an AND layer having a plural of AND gates, an OR layer having a plural of OR gates letting the outputs from the AND layer input, an output layer inputting the outputs from the OR layer and a connecting layer having pseudo-neurons Q provided between the input layer and the AND layer, and the connections between the input layer and the AND layer are selected among the following connected states:

(1) the input layer is directly connected to the AND layer;
(2) the input layer is connected to the AND gate through inverters;
(3) as inputs to the AND layer, always binary 1 is input;
(4) as inputs to the AND layer, always binary 0 is input.

Herein, the pseudo-neuron Q is defined as $Q=f(WX,\theta)$ and f: is the threshold function, a sygmoid function or a partial linear function;

X: is the input signal into the pseudo-neuron Q;

W: is the weight between the input and the pseudo-neuron; and $\theta$: is the threshold of the pseudo-neuron.

Further, in the learning method in binary system according to this invention, the system is comprised with an input layer letting a plural of binary input data input, an OR layer having a plural of OR gates, an AND layer having a plural of AND gates letting the output from the OR layer input therein, an output layer inputting the outputs from the AND layer, and a connecting layer having pseudo-neurons Q provided between the input layer and the OR layer, and the connections between the input layer and the OR layer are selected among the following four connected states:

(1) the input layer is directly connected to the OR layer;
(2) the input layer is connected to the OR layer through inverters;
(3) as inputs to the OR layer, always binary 1 is input;
(4) as inputs to the OR layer, always binary 0 is input.

Herein, the pseudo-neuron Q is defined as $Q=f(WX,\theta)$ and f: is the threshold function, a sygmoid function or a partial linear function;

X: is the input signal into the pseudo-neuron Q;

W: is the weight between the input and the pseudo-neuron;

$\theta$: is the threshold of the pseudo-neuron.

Further, in the learning method in binary system according to this invention, the system is comprised with an input layer letting a plural of binary data input, an intermediate NAND layer having a plural of NAND gates, an output NAND layer having a plural of NAND gates inputting the output from the intermediate NAND layer, an output layer inputting the output from the output NAND layer and a connecting layer having pseudo-neurons Q provided between the input layer and the intermediate NAND layer, and the connections between the input layer and the intermediate NAND layer selected among the following connected states:

(1) the input layer is directly connected to the NAND layer;
(2) the input layer is connected to the NAND layer through inverters;
(3) as inputs to the NAND layer, always binary 1 is input;
(4) as inputs to the NAND layer, always binary 0 is input.

Herein, the pseudo-neuron Q is defined as $Q=f(WX,\theta)$ and, f: is the threshold function, a sygmoid function or a partial linear function;

X: is the input signal input to the pseudo-neuron Q;

W: is the weight between the input and the pseudo-neuron;

$\theta$: is the threshold of the pseudo-neuron.

Further, in the learning method in binary system according to this invention, the system is comprised with an input layer letting a plural of binary data input, an intermediate NOR layer having a plural of NOR gates, an output NOR layer having a plural of NOR gates inputting the output from the intermediate NOR layer, an output layer inputting the output from the output NOR layer and a connecting layer having pseudo-neurons Q provided between the input layer and the intermediate NOR layer selected from among the following connected states:

(1) the input layer is directly connected to the intermediate NOR layer;

(2) the input layer is connected to the intermediate NOR layer through inverters;

(3) as inputs to the intermediate NOR layer, always binary 1 is input;

(4) as inputs to the intermediate NOR layer, always binary 0 is input.

Herein, the pseudo-neuron Q is defined as Q=f(WX,θ) and, f: is the threshold function, a sygmoid function or a partial linear function;

X: is the input signal input to the pseudo-neuron Q;

W: is the weight between the input and the pseudo-neurons; and

θ: is the threshold of the pseudo-neuron.

Further, in the learning method in binary system according to this invention, the system is comprised with an input layer letting a plural of binary data input, an intermediate EXOR layer having a plural of EXOR gates, an output EXOR layer having a plural of EXOR gates inputting the output from the intermediate EXOR layer, an output layer inputting the output from the output EXOR layer and a connecting layer having pseudo-neurons Q provided between the input layer and the intermediate EXOR layer, and both layers are connected by any method selected from the following four connected states:

(1) the input layer is directly connected to the intermediate EXOR layer;

(2) the input layer is connected to the intermediate EXOR layer through inverters;

(3) as inputs to the intermediate EXOR layer, always binary 1 is input;

(4) as inputs to the intermediate EXOR layer, always binary 0 is input.

Herein, the pseudo-neuron Q is defined as Q=f(WX,θ) and, f: is the threshold function, a sygmoid function or a partial linear function;

X: is the input signal input to the pseudo-neuron Q;

W: is the weight between the input and the pseudo-neuron;

θ: is the threshold of the pseudo-neuron.

Further, in these learning methods in binary systems according to this invention, it is characterized that the modification of the weights and thresholds of the pseudo-neurons are performed by gradient descending method.

Further, in these learning methods in binary systems according to this invention, it is characterized that the pseudo-potential energies of each of basic gates are calculated together with expressing of the connected states of aforementioned connecting layer, and that learning is performed by modifying the pseudo- potential energies of the connected states.

EFFECTS OF THE INVENTION

Applying these learning methods in binary systems according to this invention, it is possible to obtain specified learning effects during a very short learning period, as constructed as described above. Further, as all functions are realized with simple logic gates, it becomes possible to easily construct and practice the portion performing logical operation of the learning algorithm and modifying circuit.

Further, as it is easy to implement these learning methods into the conventional computer and other digital equipment, these learning methods are expected to be used widely in image processing, voice processing, natural word processing and motion control.

What is claimed is:

1. Learning method in a binary system comprising the steps of:

Providing any of an OR, AND, NOR, NAND, and EXOR gates as a first binary gate and a second binary gate, respectively, providing a learning network, comprised of an input layer consisting of plural binary input terminals, a connecting layer, first binary gate layers consisting of plural logic elements of the same kind, second binary gate layers consisting of plural logic elements of the same kind, and output layers, in which signals are not coupled in each layer but are coupled only in one direction among the layers from the input layers to the output layers;

selecting one connection of said first gate to said second gate from a direct connection, a connection through an inverter, a connection to said second gate always input with binary 1, and a connection to said second gate always input with binary 0, and reducing or eliminating an error in the output layer between an actual signal and a teacher's signal when the first and second gates are connected to perform learning, providing a pseudo-neuron Q, defined as follows, between either of said first binary gate or input data and said second binary gate, selecting the connection between them in accordance with the value of said pseudo-neuron Q, and defining said pseudo-neuron Q, as Q=f(WX,θ) in which f is the threshold function, a sigmoid function or a partial linear function;

X is the input signal to the pseudo-neuron Q;

W is the weight between the input and a pseudo-neuron Q; and

θ is the threshold of the pseudo-neuron Q.

2. Learning method in a binary system comprising the steps of:

Providing any of an OR, AND, NOR, NAND, and EXOR gates as a first binary gate and a second binary gate, respectively, providing a learning network, comprised of an input layer consisting of plural binary input terminals, a connecting layer, first binary gate layers consisting of plural logic elements of the same kind, second binary gate layers consisting of plural logic elements of the same kind, and output layers, in which signals are not coupled in each layer but are coupled only in one direction among the layers from the input layers to the output layers;

selecting one connection of an input to any one of the binary gates from a direct connection, a connection through an inverter, a connection to an existing binary gate always input with binary 1, and a connection to an existing binary gate always input with binary 0, and reducing or eliminating an error in the output layer between an actual signal and a teacher's signal when the input and one of the binary gates are connected to perform learning, providing a pseudo-neuron Q, defined as follows, between either of said first binary gate or input data and said second binary gate, selecting the connection between them in accordance with the value of said pseudo-neuron Q, and defining said pseudo-neuron Q, as Q=f(WX,θ) in which
  f is the threshold function, a sigmoid function or a partial linear function;
  X is the input signal to the pseudo-neuron Q;
  W is the weight between the input and a pseudo-neuron Q; and
  θ is the threshold of the pseudo-neuron Q.

3. Learning method in a binary system comprising the steps of:
  Providing any of an OR, AND, NOR, NAND, and EXOR gates as a first binary gate and a second binary gate, respectively,
  providing a learning network, comprised of an input layer consisting of plural binary input terminals, a connecting layer, first binary gate layers consisting of plural logic elements of the same kind, second binary gate layers consisting of plural logic elements of the same kind, and output layers, in which signals are not coupled in each layer but are coupled only in one direction among the layers from the input layers to the output layers;
  selecting one connection of internal conditions including present and former inputs to any one of the binary gates from a direct connection, a connection through an inverter, a connection to an existing binary gate always input with binary 1, and a connection to an existing binary gate always input with binary 0, and
  reducing or eliminating an error in the output layer between an actual signal and a teacher's signal when the internal conditions and one of the binary gates are connected to perform learning,
  providing a pseudo-neuron Q, defined as follows, between either of said first binary gate or input data and said second binary gate, selecting the connection between them in accordance with the value of said pseudo-neuron Q, and defining said pseudo-neuron Q, as Q=f(WX,θ) in which
    f is the threshold function, a sigmoid function or a partial linear function;
    X is the input signal to the pseudo-neuron Q;
    W is the weight between the input and a pseudo-neuron Q; and
    θ is the threshold of the pseudo-neuron Q.

4. Learning method in a binary system as claimed in any of claims 1, 2 or 3, wherein the connection between said first binary gate and said input, said first binary gate and said second binary gate, or said first binary gate and both said input and said second binary gate is constructed to select any one of said connections in accordance with results computed between the input signal input into said first binary gate and a teacher's signal for learning.

5. Learning method in a binary system as claimed in claim 4, wherein a pseudo-neuron Q, defined as follows, is provided between either of said first binary gate or input data and said second binary gate, the connection between them is selected in accordance with the value of said pseudo-neuron Q, and as above shown, said pseudo-neuron Q is defined as Q=f(WX,θ) in which
  f is the threshold function, a sygmoid function or a partial linear function;
  X is the input signal input to the pseudo-neuron Q;
  W is the weight between the input and the pseudo-neuron Q; and
  θ is the threshold of the pseudo-neuron Q.

6. Learning method in a binary system as claimed in claim 4, and further comprising the step of performing modifications of weights W and thresholds θ by using the gradient descent method.

7. Learning method in a binary system as claimed in claim 4, and further comprising the steps of calculating quasi-potential energies in each of the basic gates together with expressing the connection between said connecting layer with the quasi-potential energy, and modifying the quasi-potential energy of said connected states to perform learning.

8. Learning method in a binary system as claimed in any of claims 1–3, and further comprising the step of performing modifications of weights W and thresholds θ by using the gradient descent method.

9. Learning method in a binary system as claimed in any of claims 1–3, and further comprising the steps of calculating quasi-potential energies in each of the basic gates together with expressing the connection between said connecting layer with the quasi-potential energy, and modifying the quasi-potential energy of said connected states to perform learning.

10. Learning method in a binary system as claimed in any of the claims 1, 2 or 3 and further comprising the step of performing modifications of weights W and thresholds θ by using the gradient descent method.

11. Learning method in a binary system as claimed in any of the claims 1, 2 or 3 and further comprising the steps of calculating quasi-potential energies in each of the basic gates together with expressing the connection between said connecting layer with the quasi-potential energy, and modifying the quasi-potential energy of said connected states to perform learning.

12. Binary systems in which learning methods are performed comprising:
  an input layer allowing plural binary data to be input into itself,
  an AND layer having plural AND gates,
  an OR layer having plural OR gates inputting an output from the AND layer,
  an output layer inputting an output from said OR layer, and
  a connecting layer having pseudo-neurons Q provided between the input layer and said AND layer,
  wherein learning is performed by selecting a connection connecting said input layer to said AND layer from a connection by which said input layer is directly connected to said AND layer, a connection by which said input layer is connected to said AND layer through inverters, a connection by which, as inputs to said AND layer, binary 1 is always input, and a connection by which, as inputs to said AND layer, binary 0 is always input, and
  wherein said pseudo-neuron Q is defined as Q=f(WX,θ), in which f is a threshold function, a sygmoid function or a partial linear function, X is the input signal input to said pseudo-neuron Q, W is the weight between said input and said pseudo-neuron Q, and θ is a threshold of said pseudo-neuron Q.

13. Binary systems in which learning methods are performed comprising:
  an input layer allowing plural binary data to be input into itself,
  an OR layer having plural OR gates,
  an AND layer having plural AND gates inputting an output from said OR layer,
  an output layer inputting an output from said AND layer, and a connecting layer having pseudo-neurons Q provided between the input layer and said OR layer, wherein learning is performed by selecting a connection connecting said input layer to said OR layer from a connection by which said input layer is directly connected to said OR layer, a connection by which said input layer is connected to said OR layer through inverters, a connection by which, as inputs to said OR layer, binary 1 is always input, and a connection by which, as inputs to said OR layer, binary 0 is always input, and wherein said pseudo-neuron Q is defined as Q=f(WX,θ), in which f is a threshold function, a sygmoid function or a partial linear function, X is the input signal input to said pseudo-neuron Q, W is the weight between said input and said pseudo-neuron Q, and θ is the threshold of said pseudo-neuron Q.

14. Binary systems in which learning methods are performed comprising:

an input layer allowing plural binary data to be input into itself, an intermediate NAND layer having plural NAND gates, an output NAND layer having plural NAND gates inputting an output from said intermediate NAND layer, an output layer inputting an output from said NAND layer, and a connecting layer having pseudo-neurons Q provided between the input layer and said intermediate NAND layer, wherein learning is performed by selecting a connection connecting said input layer to said NAND layer from a connection by which said input layer is directly connected to said intermediate NAND layer, a connection by which said input layer is connected to said intermediate NAND layer through inverters, a connection by which, as inputs to said intermediate NAND layer, binary 1 is always input, and a connection by which, as inputs to said intermediate NAND layer, binary 0 is always input, and wherein said pseudo-neuron Q is defined as Q=f(WX,θ), in which f is a threshold function, a sygmoid function or a partial linear function, X is the input signal input to said pseudo-neuron Q, W is the weight between said input and said pseudo-neuron Q, and θ is the threshold of said pseudo-neuron Q.

15. Binary systems in which learning methods are performed comprising:

an input layer allowing plural binary data to be input into itself, an intermediate NOR layer having plural NOR gates, an output NOR layer having plural NOR gates inputting an output from said intermediate NOR layer, an output layer inputting an output from said output NOR layer, and a connecting layer having pseudo-neurons Q provided between the input layer and said intermediate NOR layer, wherein learning is performed by selecting a connection connecting said input layer to said intermediate NOR layer from a connection by which said input layer is directly connected to said intermediate NOR layer, connection by which said input layer is connected to said intermediate NOR layer through inverters, a connection by which, as inputs to said intermediate NOR layer, binary 1 is always input, and a connection by which, as inputs to said intermediate NOR layer, binary 0 is always input, and wherein said pseudo-neuron Q is defined as Q=f(WX,θ), in which f is a threshold function, a sygmoid function or a partial linear function, X is an input signal input to said pseudo-neuron Q, W is the weight between said input and said pseudo-neuron Q, and θ is the threshold of said pseudo-neuron Q.

16. Binary systems in which learning methods are performed comprising:

an input layer allowing plural binary data to be input into itself, an intermediate EXOR layer having plural EXOR gates, an output EXOR layer having plural EXOR gates inputting an output from said intermediate EXOR layer, an output layer inputting an output from said output EXOR layer, and a connecting layer having pseudo-neurons Q provided between the input layer and said intermediate EXOR layer, wherein learning is performed by selecting a connection connecting said input layer to said intermediate EXOR layer from a connection by which said input layer is directly connected to said intermediate EXOR layer, a connection by which said input layer is connected to said intermediate EXOR layer through inverters, a connection by which, as inputs to said intermediate EXOR layer, binary 1 is always input and a connection by which, as inputs to said intermediate EXOR layer, binary 0 is always input, and wherein said pseudo-neuron Q is defined as Q=f(WX,θ), in which f is a threshold function, a sygmoid function or a partial linear function, X is an input signal input to said pseudo-neuron Q, W is the weight between said input and said pseudo-neuron Q, and θ is the threshold of said pseudo-neuron Q.

* * * * *